United States Patent
Armbruster et al.

(10) Patent No.: US 9,033,445 B1
(45) Date of Patent: *May 19, 2015

(54) COLOR-TO-COLOR CORRECTION IN A PRINTING SYSTEM

(71) Applicant: Eastman Kodak Company, Rochester, NY (US)

(72) Inventors: Randy Eugene Armbruster, Rochester, NY (US); Christopher M. Muir, Rochester, NY (US); James Alan Katerberg, Kettering, OH (US)

(73) Assignee: EASTMAN KODAK COMPANY, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/063,351

(22) Filed: Oct. 25, 2013

(51) Int. Cl.
B41J 2/165 (2006.01)
B41J 2/21 (2006.01)

(52) U.S. Cl.
CPC .................... B41J 2/2132 (2013.01)

(58) Field of Classification Search
None
See application file for complete search history.

(56) References Cited

U.S. PATENT DOCUMENTS

| 5,272,492 | A | 12/1993 | Castelli |
| 8,104,861 | B2 | 1/2012 | Saettel et al. |
| 2006/0023231 | A1 | 2/2006 | Ohmiya |
| 2008/0123139 | A1 | 5/2008 | Harada |
| 2010/0135702 | A1 | 6/2010 | Calamita et al. |
| 2013/0286071 | A1* | 10/2013 | Armbruster et al. ............ 347/14 |

FOREIGN PATENT DOCUMENTS

EP  1 424 609  6/2004

* cited by examiner

*Primary Examiner* — Alejandro Valencia
(74) *Attorney, Agent, or Firm* — Amit Singhal

(57) ABSTRACT

A method for performing color-to-color correction for printing multiple copies of a print job having one or more documents is disclosed. A first copy of the print job is printed using a plurality of color planes. A first plurality of color registration errors produced during the printing of the first copy of the print job is determined. For each document in the print job, a processor is used to determine a first plurality of local color plane correction values for each color registration error produced during the printing of the first copy of the print job. Each of the first plurality of local color plane correction values corresponds to one of the first plurality of color registration errors. A second copy of the print job is printed using the local color plane correction values for each document in the print job.

15 Claims, 23 Drawing Sheets

COLOR-TO-COLOR CORRECTION IN A PRINTING SYSTEM

CROSS-REFERENCE TO RELATED APPLICATION(S)

Reference is made to commonly-assigned, U.S. patent application Ser. No. 14/063,276, entitled "COLOR-TO-COLOR CORRECTION IN A PRINTING SYSTEM", Ser. No. 14/063,331, entitled "COLOR-TO-COLOR CORRECTION IN A PRINTING SYSTEM", Ser. No. 14/063,374, entitled "COLOR-TO-COLOR CORRECTION IN A PRINTING SYSTEM", Ser. No. 14/063,406, entitled "COLOR-TO-COLOR CORRECTION IN A PRINTING SYSTEM", all filed concurrently herewith.

TECHNICAL FIELD

The present invention generally relates to inkjet printing systems and more particularly to performing color-to-color registration correction in an inkjet printing system.

BACKGROUND

In a digitally controlled printing system, a print medium is directed through a series of components. The print medium can be cut sheet or a continuous web. As the print medium moves through the printing system, liquid, for example, ink, is applied to the print medium by one or more lineheads. This is commonly referred to as jetting of the ink.

In commercial inkjet printing systems, the print medium is physically transported through the printing system at a high rate of speed. For example, the print medium can travel 650 to 1000 feet per minute. The lineheads in commercial inkjet printing systems typically include multiple printheads that jet ink onto the print medium as the print medium is being physically moved through the printing system. A reservoir containing ink or some other material is usually behind each nozzle plate in a linehead. The ink streams through the nozzles in the nozzle plates when the reservoirs are pressurized.

The printheads in each linehead in commercial printing systems typically jet only one color. Thus, there is a linehead for each colored ink when different colored inks are used to print content. For example, there are four lineheads in printing systems using cyan, magenta, yellow and black colored inks. The content is printed by jetting the colored inks sequentially, and each colored ink deposited on the print medium is known as a color plane. The color planes need to be aligned, or registered with each other so that the overlapping ink colors produce a quality single image.

Color registration errors can be partitioned into different types. Examples of color registration errors include, but are not limited to, a color plane having a linear translation with respect to another color plane, a color plane being rotated with respect to another color plane, and a color plane being stretched, contracted, or both stretched and contracted in different regions or in different directions with respect to another color plane.

There are several variables that contribute to the registration errors in color plane alignment including physical properties of the print medium, conveyance of print medium, ink application system, ink coverage, and drying of ink. Color registration errors are typically managed by controlling these variables. However, controlling these variables can often restrict the range of desired print applications. For example, color plane to color plane registration errors will typically become larger than desired as paper weight for the print application is reduced, when ink coverage is increased, or when the amount of ink coverage becomes more variable between printed documents. These limitations compromise the range of suitable applications for ink jet printing systems.

SUMMARY

A method for performing color-to-color correction for printing multiple copies of a print job having one or more documents comprises printing a first copy of the print job using a plurality of color planes, determining a first plurality of color registration errors produced during the printing of the first copy of the print job, for each document in the print job, using a processor to determine a first plurality of local color plane correction values for each color registration error produced during the printing of the first copy of the print job, wherein each of the first plurality of local color plane correction values corresponds to one of the first plurality of color registration errors, and printing a second copy of the print job using the local color plane correction values for each document in the print job.

A printing system for printing multiple copies of a print job having one or more documents comprises a plurality of printheads adapted to print on a print medium, wherein each of the plurality of printheads prints each of a plurality of color planes of a first copy of the print job, a processor to determine a first plurality of color registration errors produced during the printing of the first copy of the print job, and to determine a first plurality of local color plane correction values for each document of the print job, wherein each of the first plurality of local color plane correction values corresponds to one of the first plurality of color registration errors, and the plurality of printheads printing a second copy of the print job using the local color plane correction values for each document in the print job.

Advantages of the present invention include reducing color-to-color registration errors when printing multiple copies of a print job. Local adjustments to the global color plane correction values permit finer corrections to be made to the documents, which is especially advantageous when the document contains a mix of information types such as text and images.

BRIEF DESCRIPTION OF THE DRAWINGS

Embodiments of the invention are better understood with reference to the following drawings. The elements of the drawings are not necessarily to scale relative to each other.

DETAILED DESCRIPTION

Figure 1:
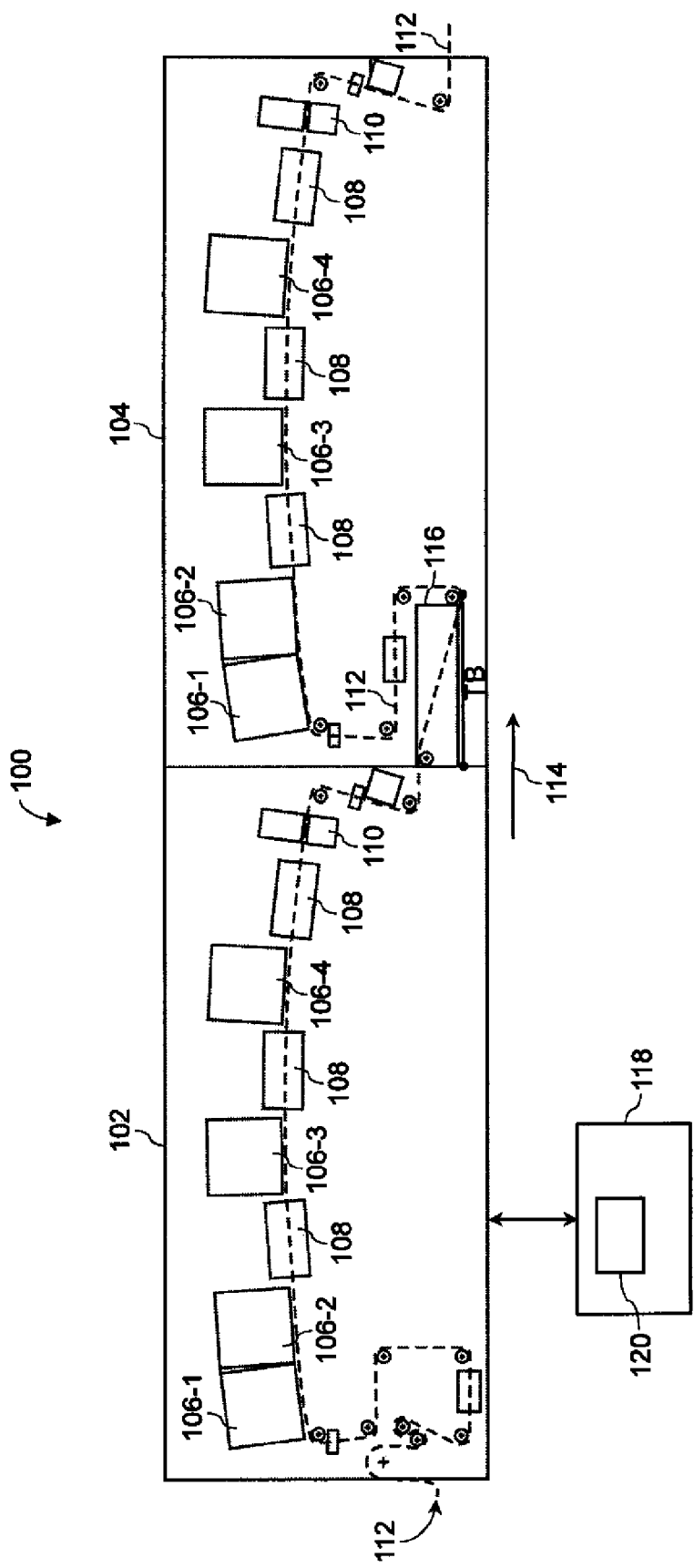
FIG. 1 is a schematic of a continuous web inkjet printing system.

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on", "over", "top", "bottom", "left", "right" are used with reference to the orientation of the Figure(s) being described. Because components of aspects of the present invention can be positioned in a number of different orientations, the directional terminology is used for purposes of illustration only and is in no way limiting.

The present description will be directed in particular to elements forming part of, or cooperating more directly with, a system in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example aspects of the present invention are illustrated schematically and not to scale for the sake of clarity. One of ordinary skill in the art will be able to readily determine the specific size and interconnections of the elements of the example aspects of the present invention.

As described herein, the example aspects of the present invention are applied to color plane registration in inkjet printing systems. However, many other applications are emerging which use inkjet printheads or similar nozzle arrays to emit fluids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. In addition, a nozzle array can jet out gaseous material or other fluids. As such, as described herein, the terms "liquid", "ink" and "inkjet" refer to any material that is ejected by a nozzle array. For simplicity and clarity of description, the invention will be described in terms of a multi-color printer. It must be understood that the invention similarly applies to other applications such as the printing of multiple layers of an electronic circuit where the individual circuit layers would correspond to an image plane in the color printer. In such applications, registration of the individual layers must be maintained for proper operation of the electronic circuit in a similar manner to the registration of the color image planes in the color prints. It is anticipated that many other applications may be developed in which the invention may be employed to enhance the registration of the image planes.

Inkjet printing is commonly used for printing on paper. However, printing can occur on any substrate or receiving medium. For example, vinyl sheets, plastic sheets, glass plates, textiles, paperboard, and corrugated cardboard can comprise the print medium. Additionally, although the term inkjet is often used to describe the printing process, the term jetting is also appropriate wherever ink or other fluid is applied in a consistent, metered fashion, particularly if the desired result is a thin layer or coating.

Inkjet printing is a non-contact application of an ink to a print medium. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting drops so that print drops reach the print medium and non-print drops are caught by a collection mechanism. Various approaches for selectively deflecting drops have been developed including electrostatic deflection, air deflection, and thermal deflection.

Additionally, there are typically two types of print medium used with inkjet printing systems. The first type is commonly referred to as a continuous web while the second type is commonly referred to as cut sheet(s). The continuous web of print medium refers to a continuous strip of print medium, generally originating from a source roll. The continuous web of print medium is moved relative to the inkjet printing system components via a web transport system, which typically includes drive rollers, web guide rollers, and web tension sensors. Cut sheets refer to individual sheets of print medium that are moved relative to the inkjet printing system components via a support mechanism (e.g., rollers and drive wheels or a conveyor belt system) that is routed through the inkjet printing system.

The invention described herein is applicable to both types of printing technologies. As such, the terms linehead and printhead, as used herein, are intended to be generic and not specific to either technology. Additionally, the invention described herein is applicable to both types of print medium. As such, the terms print medium, and web, as used herein, are intended to be generic and not as specific to one type of print medium or web or the way in which the print medium or web is moved through the printing system. Additionally, the terms linehead, printhead, print medium, and web can be applied to other nontraditional inkjet applications, such as printing conductors on plastic sheets.

The terms "color plane" and "image plane" are used generically and interchangeably herein to refer to a portion of the data that is used to specify the location of features that are made by a particular station of a digitally controlled printing system on the print medium. Similarly, "color-to-color registration" is used generically herein to refer to the registration of such features that are made by different stations on the print medium. For color printing of images, the patterns of dots printed by different printheads in printing the same or different colors must be registered with each other to provide a high quality image. An example of a non-color printing application is functional printing of a circuit. The patterns of dots printed by different printheads, the image planes, form directly or serve as catalysts or masks for the formation of different layers of deposited conductive materials, semiconductor materials, resistive materials, insulating materials of various dielectric constants, high permeability magnetic materials, or other types of materials, must also be registered to provide a properly functioning circuit. The terms color plane and color-to-color registration can also be used herein to refer to the mapping and registration of pre-print or finishing operations, such as the mapping of where the folds or cutting or slitting lines are, or the placement of vias in an electrical circuit.

The terms "upstream" and "downstream" are terms of art referring to relative positions along the transport path of the print medium; points on the transport path move from upstream to downstream. In FIGS. 1-6 the print medium moves in a direction indicated by transport direction arrow 114. Where they are used, terms such as "first", "second", and so on, do not necessarily denote any ordinal or priority relation, but are simply used to more clearly distinguish one element from another.

The schematic side view of FIG. 1 shows one example of a continuous web inkjet printing system. Printing system 100 includes a first tower 102 and a second tower 104, each of which includes lineheads 106, dryers 108, and a quality control sensor 110. Each linehead 106 typically includes multiple printheads (not shown) that apply ink or another fluid (gas or liquid) to the surface of the print medium 112 that is adjacent to the printheads. For descriptive purposes only, the lineheads 106 are labeled a first linehead 106-1, a second linehead 106-2, a third linehead 106-3, and a fourth linehead 106-4. In the illustrated aspect, each linehead 106-1, 106-2, 106-3, 106-4 applies a different colored ink to the surface of the print medium 112 that is adjacent to the lineheads. By way of example only, linehead 106-1 applies cyan colored ink, linehead 106-2 magenta colored ink, linehead 106-3 yellow colored ink, and linehead 106-4 black colored ink.

The first tower 102 and the second tower 104 also include a web tension system that serves to physically move the print medium 112 through the printing system 100 in the transport direction 114 (left to right as shown in the figure). The print medium 112 enters the first tower 102 from a source roll (not shown) and the linehead(s) 106 of the first tower applies ink to one side of the print medium 112. As the print medium 112 feeds into the second tower 104, a turnover module 116 is adapted to invert or turn over the print medium 112 so that the linehead(s) 106 of the second tower 104 can apply ink to the other side of the print medium 112. The print medium 112 then exits the second tower 104 and is collected by a print medium receiving unit (not shown).

Processor 118 can be connected to various components in the web tension system and used to control the positions of the components, such as gimbaled or caster rollers. Processor 118 can be connected to the quality control sensor 110 and used to process images or data received from the sensor 110. Processor 118 can be connected to components in printing system 100 using any known wired or wireless communication connection. Processor 118 can be a separate from printing system 100 or integrated within printing system 100 or within a component in printing system 100. Processor 118 can be a single processor or one or more processors. Each of the one or more processors can be separate from the printing system or integrated within the printing system.

One or more storage devices 120 are connected to the processor 118. The storage device 120 can store color plane correction values in an aspect of the invention. The storage device 120 can be implemented as one or more external storage devices; one or more storage devices included within the processor 118; or a combination thereof. The storage device can include its own processor and can have memory accessible by the one or more processors 118.

Figure 2:
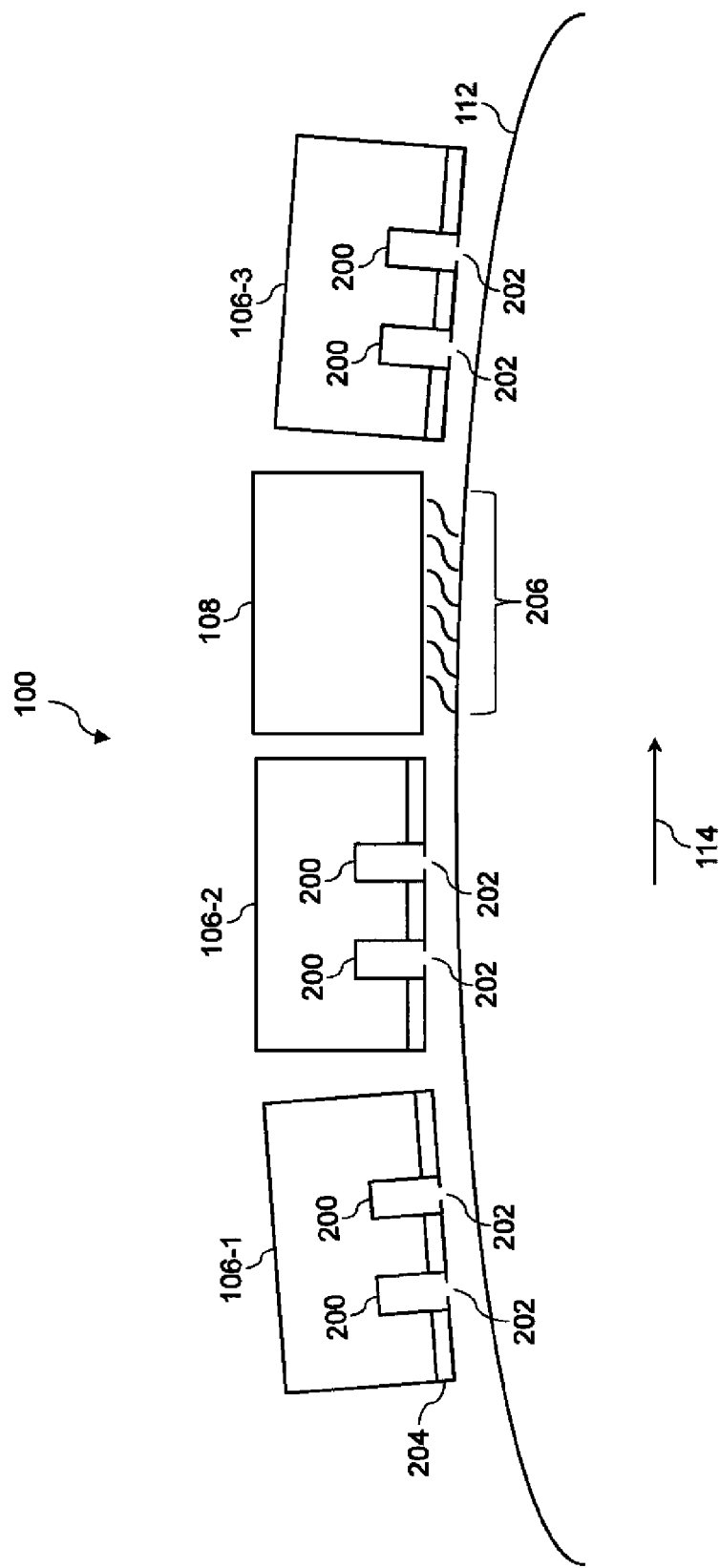
FIG. 2 is a schematic of a portion of printing system 100 in more detail.

FIG. 2 illustrates a portion of printing system 100 in more detail. As the print medium 112 is moved through printing system 100, the lineheads 106, which typically include a plurality of printheads 200, apply ink or another fluid onto the print medium 112 via the nozzle arrays 202 of the printheads 200. The printheads 200 within each linehead 106 are located and aligned by a support structure 204 in the illustrated aspect. After the ink is jetted onto the print medium 112, the print medium 112 passes beneath the one or more dryers 108 which apply heat or air 206 to the ink on the print medium.

Figure 3:
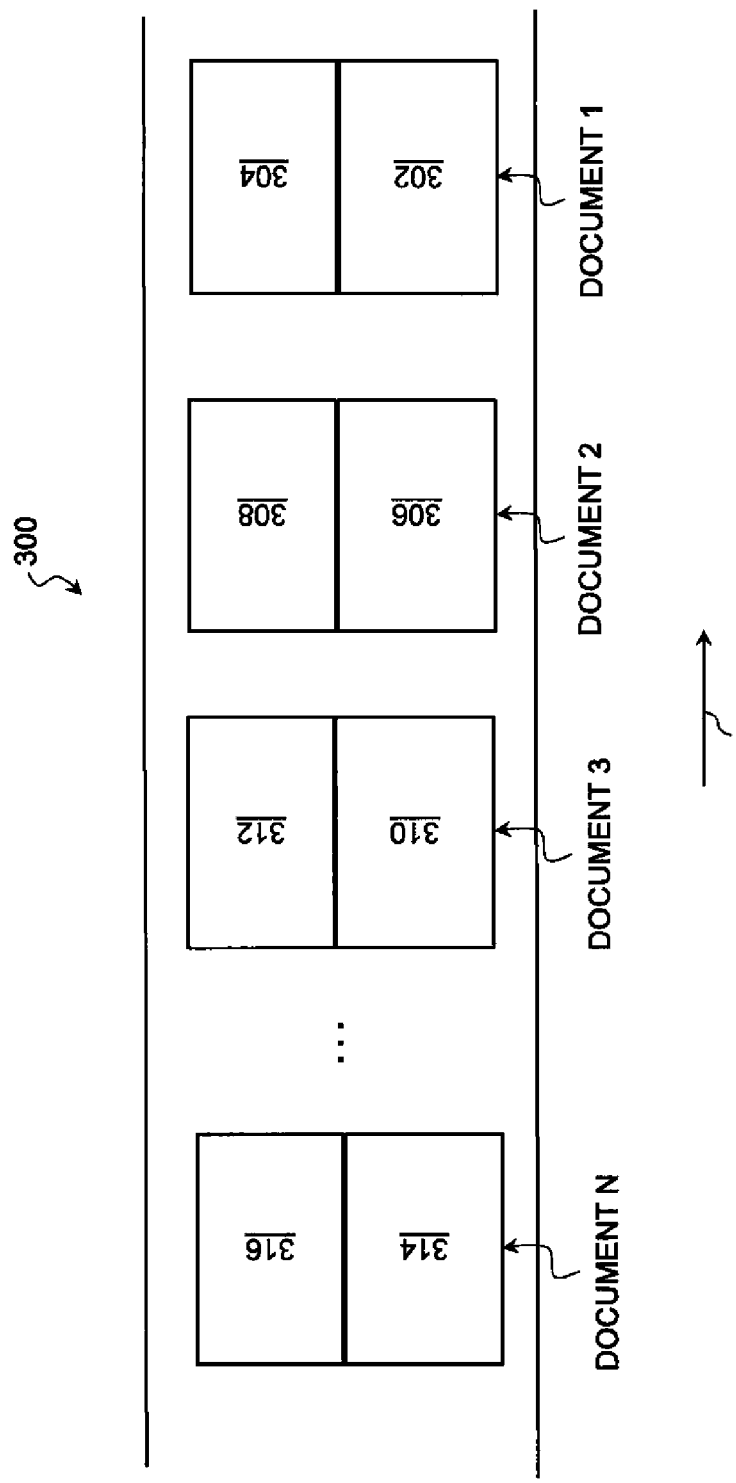
FIG. 3 illustrates a print job including a number of documents according to an aspect of the invention.

Referring now to FIG. 3, there is shown one example of a print job 300 including a number of documents to be printed in sequential order. As used herein, the term "print job" refers to information to be printed more than once, the print job 300 includes one or more documents, and the content in the information is substantially the same each time a copy of the information or a document is printed. The information to be printed can have some variations. For example, a report that is sent to multiple recipients can vary the name and address of the recipient in each printing of the report while maintaining the consistency of the rest of the information to be printed. Examples of such information include, but are not limited to, books, magazines, reports, and transactions.

A print job includes a sequence of N number of documents, where N is equal to or greater than one. In the illustrated aspect, the print job 300 includes N documents with each document having two pages, for example 302 and 304, 306 and 308, 310 and 312, and 314 and 316. A book is one example of a print job that is arranged as the print job 300 depicted in FIG. 3.

A print job can have one document positioned across the width of the print medium in an aspect of the invention. The print job depicted in FIG. 3 illustrates one document positioned across the width on the print medium. In other aspects, a print job can have multiple documents positioned across the width of the print medium. A document can include any printed output such as, for example, text, graphics, or photos, individually or in various combinations. The printed output can be disposed anywhere on the print medium, and the printed output in each document can differ from the printed content in the other documents in a print job.

When the print job is printed, the print medium can receive varying amounts of ink during printing. In turn, the aqueous component of the ink is absorbed into the print medium and can cause the print medium to swell and stretch, especially with water-based ink or in high ink laydown regions of the printed content (e.g. an image with a lot of dense black background) and if the print medium is under tension. Stretch can be higher in the direction of movement (i.e., the in-track or transport direction) than in the cross-track direction.

Additionally, drying of the print medium can cause the print medium to shrink. When the print medium is heated in between lineheads, regions of the print medium can be stretched and shrunk one or more times as the print medium moves through the printing system.

Printing with several color planes in which each color record is printed sequentially requires color laydown registration. Unanticipated or unaccounted for stretch or shrink in the print medium can produce a loss of color registration and can lead to blurry content or hue degradation. Additionally, printing on both sides of the print medium usually requires front-to-back registration, and the second side of the print medium is usually printed significantly later than the first side.

Figure 4:
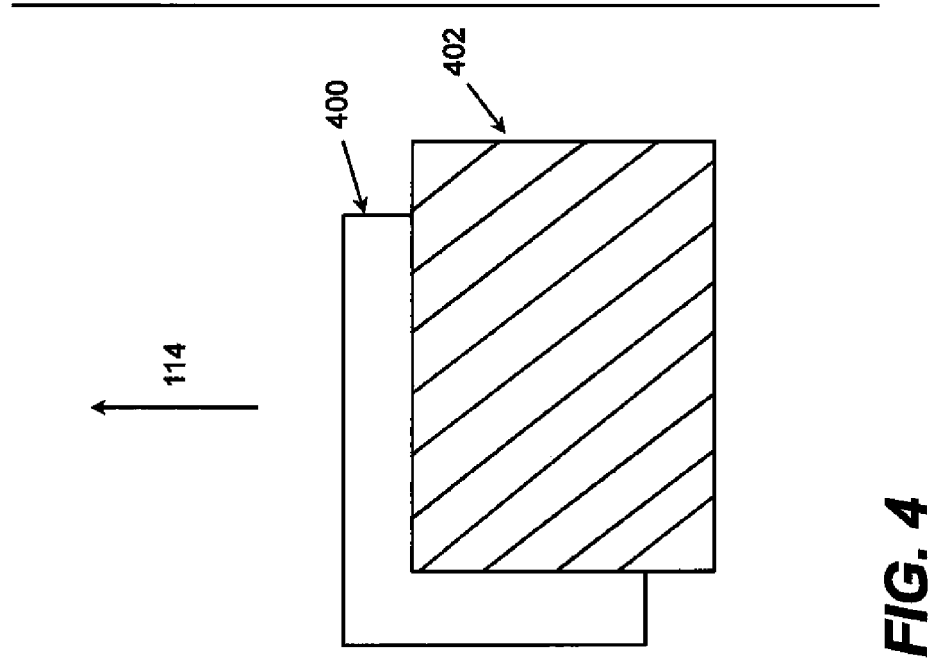
FIG. 4 illustrates one example of a color registration error produced by the translation of one color plane relative to another color plane.
Figure 4:
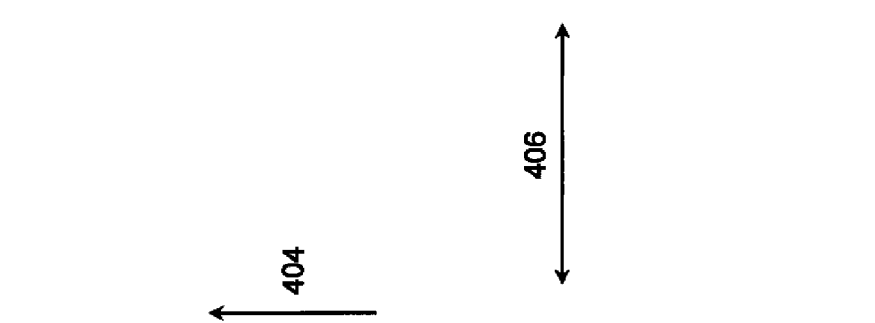

FIG. 4 depicts one example of cross-track and in-track color registration errors produced by the translation of a color plane relative to another color plane. Relative translation is one type of color registration error. Typically, one color plane is used as a reference color plane 400. By way of example only, the reference color plane can be black. Errors in registration for the remaining color planes can be determined by comparing each color plane to the reference color plane. Color plane 402 is shifted or translated with respect to the reference color plane 400. Color plane 402 has color registration errors in both the in-track direction 404 and the cross-track direction 406 in the illustrated aspect.

Figure 5:
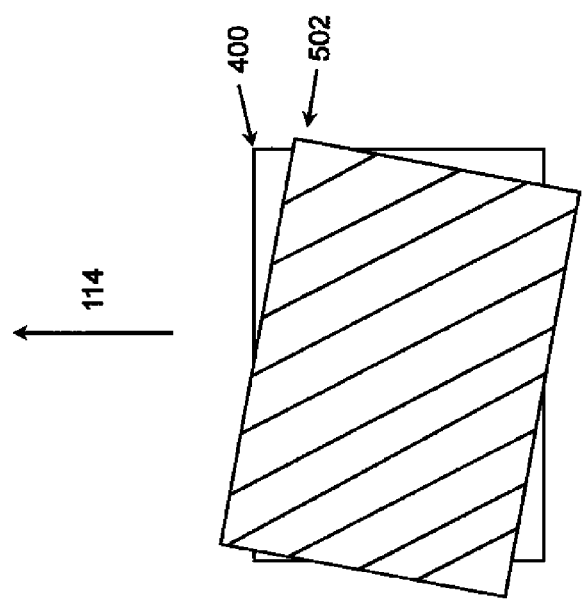
FIG. 5 illustrates one example of a color registration error produced by the rotation of one color plane relative to another color plane.
Figure 5:
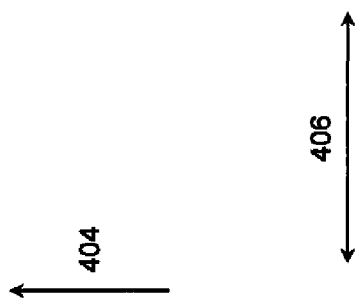

FIG. 5 illustrates one example of cross-track and in-track color registration errors caused by the rotation of a color plane relative to another color plane. Relative rotation or skew is another type of color registration error. Color plane 502 is rotated with respect to a reference color plane 400. Color plane 502 has color registration errors with respect to the reference color plane 400 in both the in-track direction 404 and the cross-track direction 406.

Figure 6:
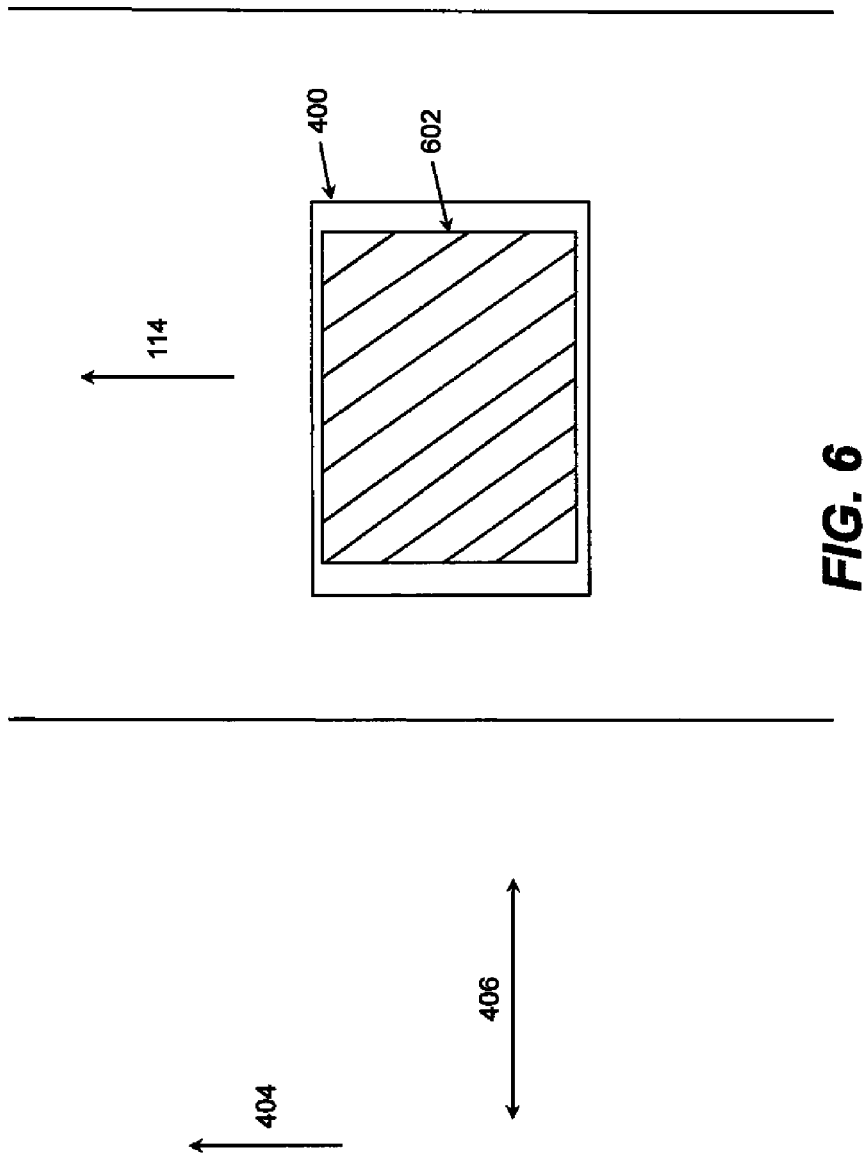
FIG. 6 illustrates one example of a color registration error produced by the contraction of one color plane relative to another color plane.

FIG. 6 depicts one example of cross-track and in-track color registration errors caused by the stretch or contraction of a color plane relative to another color plane. Stretch and contraction are another type of color registration error. The different color planes can be stretched or contracted by different amounts in the cross-track and in-track directions. Color plane 602 is contracted in both the in-track and cross-track directions with respect to the reference color plane 400. Color plane 602 has color registration errors in both the in-track direction 404 and the cross-track direction 406.

The stretching or shrinking can occur in the in-track direction, the cross-track direction, or both the in-track and cross-track directions. Alternatively, one color plane can contract in one direction (e.g., cross-track direction) and stretch in the other direction (e.g., in-track direction) in other aspects of the invention. These shifts and distortions need not be uniform across the document. As a result, certain regions of a document may exhibit expansion while other regions may exhibit no expansion or may even show contraction. And finally, other aspects of the invention can have various combinations of the types of color registration errors shown in FIGS. 4-6, or can have different types of color registration errors.

The color registration errors can repeat each time a copy of a sequence of documents in a print job is printed. Moreover, the repeating color registration errors can be specific to each document in the print job, and more specifically to particular regions within the individual documents. For example, in a print job having a sequence of three documents which are repeatedly printed in sequential order, the color registration errors in the second document can repeat each time the second document is printed. The color registration errors for the third document can be different from the color registration errors for the second document. And the color registration errors in the third document can repeat each time the third document is printed. Furthermore within the second document, there can be regions of the document which exhibit one level of particular type of registration error that is consistently different than the corresponding registration error in a different region in the same document for each copy of the second document that is printed.

Figure 7:
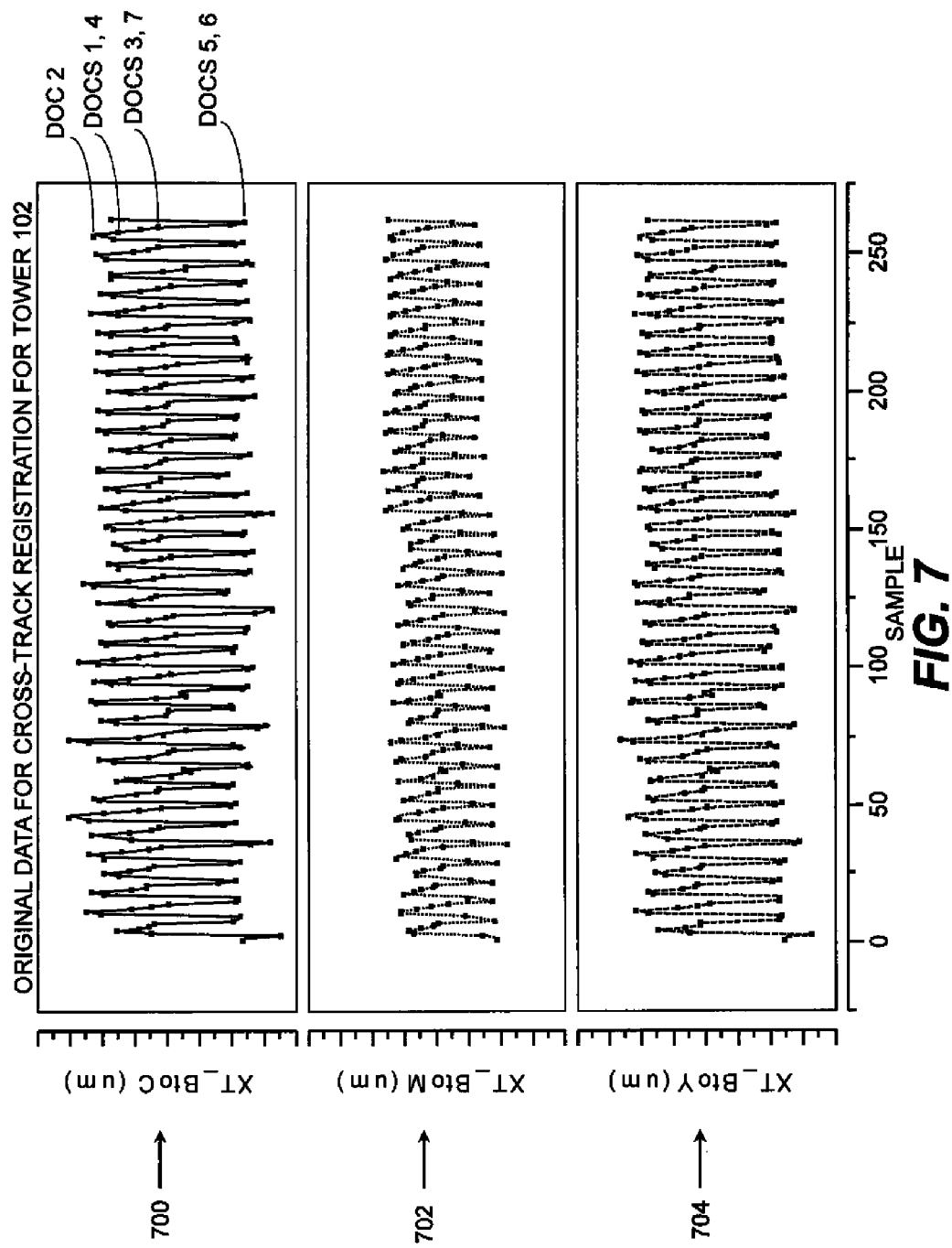
FIG. 7 depicts one example of plots of the repeatability of color-to-color registration errors in the cross-track direction.

FIG. 7 illustrates one example of plots of the repeatability of color-to-color registration errors in tower 102 in the cross-track direction. A plot 700 shows the registration errors of a first ink color relative to the reference color; plot 702 shows the corresponding registration errors for a second ink color, and a plot 704 shows the corresponding registration errors for a third ink color. For example, the first ink color can be cyan, the second ink color magenta, and the third ink color yellow, with the reference color being black.

The color registration errors for the examples shown in FIGS. 7-10 can be determined by comparing each color plane to a reference color plane, and the color registration errors can be produced by one or any combination of registration error types: color plane translation, color plane rotation, and color plane stretch or contraction in each of the in-track and cross-track directions as depicted in FIGS. 4-6. These registration errors can be measured by means of an image sensor, which captures an image of test marks printed by the various lineheads, as described in U.S. Pat. No. 8,104,861. By way of example only, the reference color can be black. Additionally, the print job associated with the examples shown in FIGS. 7-10 includes a sequence of seven documents which is repeatedly printed in sequential order. Each plotted point on the plots represents one of the seven documents in the repeated sequence of the seven documents.

The variations in the color-to-color registrations for each document are shown in each period of the waveform, and the repeatability of the color-to-color registration errors is identifiable from one copy of the sequence of seven documents to another. By way of example only, document 2 repeatedly has a registration error at the positive peak of each waveform while the registration errors for documents 1 and 4 are less than the error for document 2. The registration errors for documents 3 and 7 are less than the errors for documents 1 and 4, and the registration errors for documents 5 and 6 repeatedly fall at the bottom of the waveforms. The repeatability of this pattern is a result of the repeated sequential printing of the documents. The amount and type of color registration error for a document is related to the printing conditions for that document, such as the quantity and location of ink laydown for that document. If the documents were printed in a random order, then the registration errors for each copy would not be repeatable.

Figure 8:
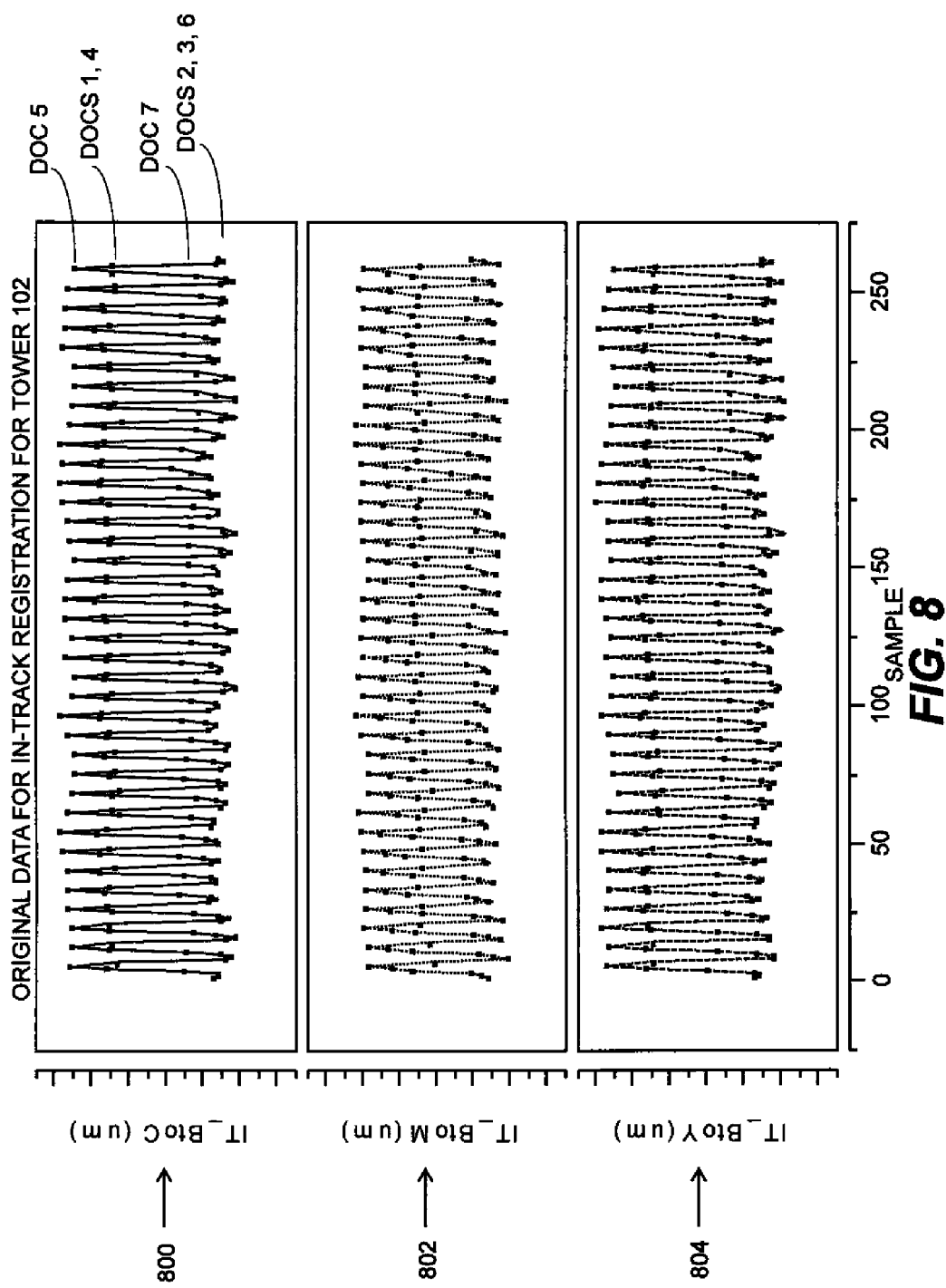
FIG. 8 depicts one example of plots of the repeatability of color-to-color registration errors in the in-track direction.

FIG. 8 illustrates one example of plots of the repeatability of color-to-color registration in tower 102 in the in-track direction. A plot 800 for the first ink color, a plot 802 for the second ink color, and a plot 804 for the third ink color are shown. In the in-track direction, document 5 repeatedly has a registration error at the positive peak of each waveform while the registration errors for documents 1 and 4 are less than the error for document 5. The registration error for document 7 is less than the errors for documents 1 and 4, and the registration errors for documents 2, 3, and 6 repeatedly lie at the bottom of the waveforms.

Figure 9:
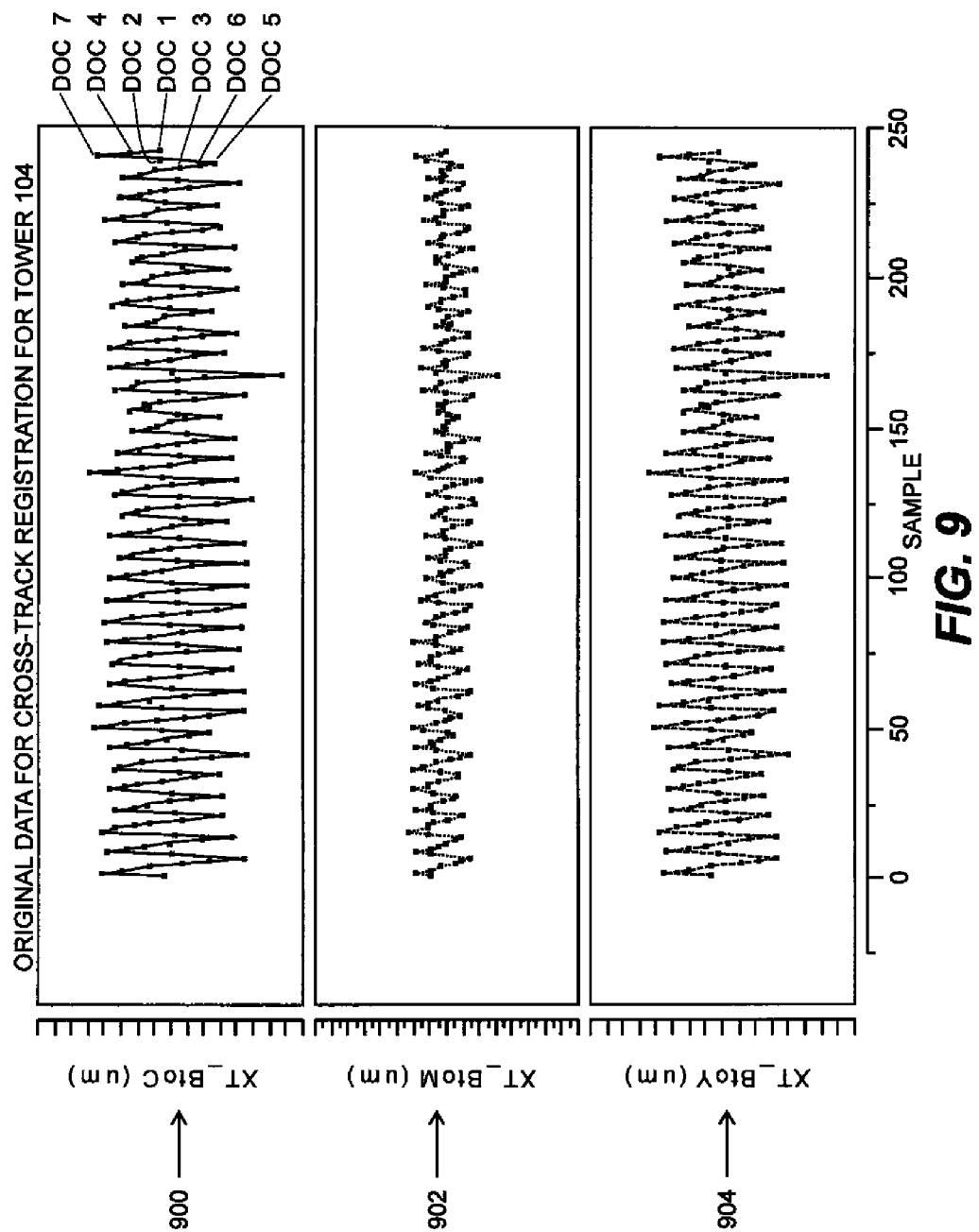
FIG. 9 depicts one example of plots of the repeatability of color-to-color registration errors in the cross-track direction.

Referring now to FIG. 9, there is shown one example of plots of the repeatability of color-to-color registration in tower 104 in the cross-track direction. A plot 900 for a first ink color, a plot 902 for a second ink color, and a plot 904 for a third ink color relative to the reference color are depicted. In this example, in the cross-track direction in the second tower (tower 104), document 7 repeatedly has a registration error at the positive peak of each waveform while the registration error for document 4 is less than the error for document 7. The registration error for document 2 is less than the registration error for document 4. The registration error for document 1 is less than the registration error for document 2. The registration error for document 3 is less than the registration error for document 1. And the registration error for document 5 is less than the registration error for document 6.

Figure 10:
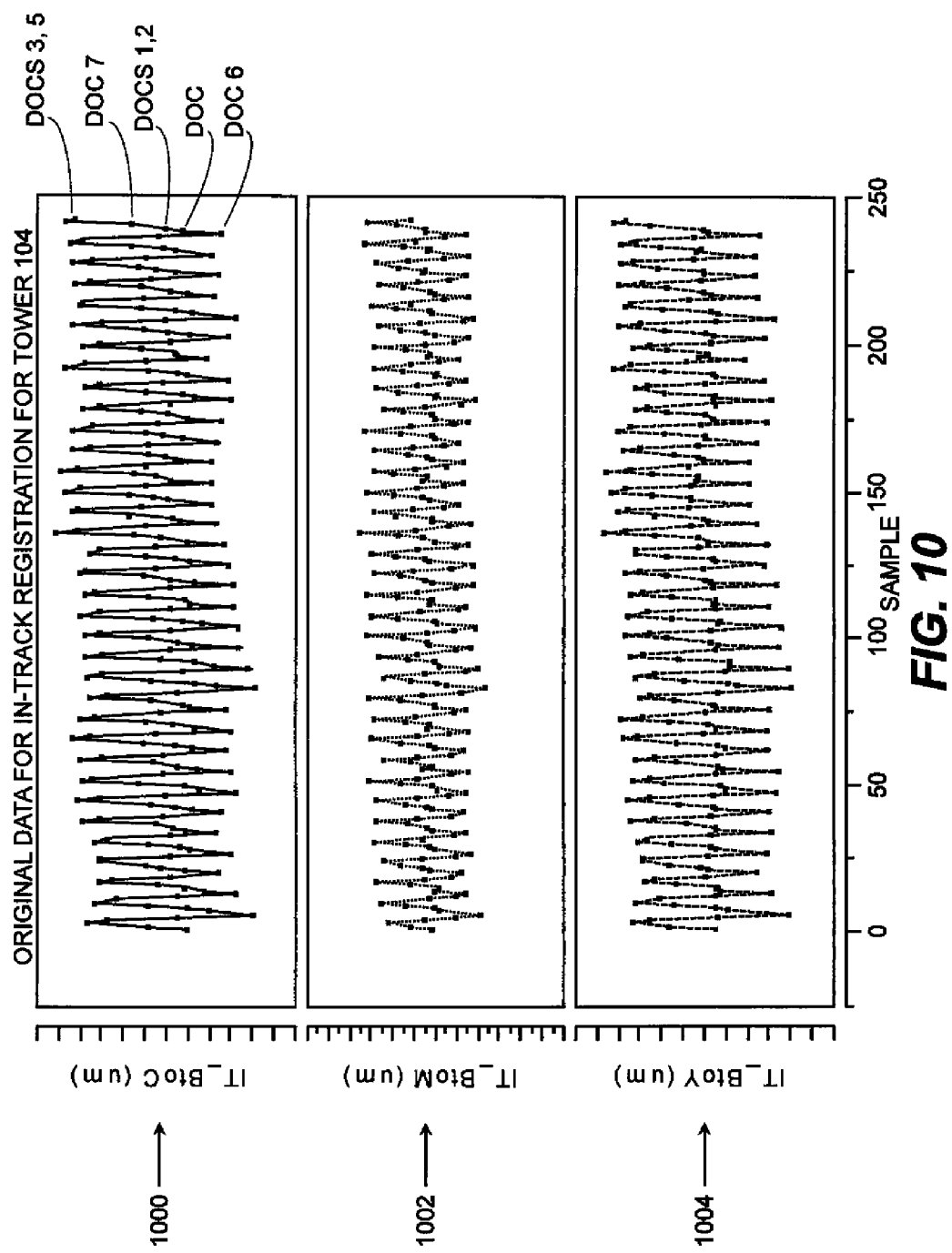
FIG. 10 depicts one example of plots of the repeatability of color-to-color registration errors in the in-track direction.

FIG. 10 illustrates one example of plots of the repeatability of color-to-color registration in tower 104 in the in-track direction. A plot 1000 for the first ink color, a plot 1002 for the second ink color, and a plot 1004 for the third ink color are shown. In this example, in the in-track direction, documents 3 and 5 repeatedly have registration errors at the positive peak of each waveform while the registration error for document 7 is less than the values for documents 3 and 5. The registration errors for documents 1 and 2 are less than the error for document 7, and the registration errors for documents 4 and 6 repeatedly fall at the bottom of the waveforms.

U.S. patent application Ser. No. 13/664,472 (filed Apr. 26, 2012), which is herein incorporated by reference in its entirety, discloses a method for performing color-to-color correction while printing multiple copies of a print job having one or more documents where the method includes printing one or more copies of the print job and determining at least one color registration error for at least one type of color registration error produced during the printing of the one or more copies of the print job. A color plane correction value is then determined for each document in the print job and for each color plane error produced during the printing of the one or more copies of the print job. One or more subsequent copies of the print job is printed using the color plane correction values, where the color plane correction values used for each document are the correction values determined for that document. The color plane correction values can be updated periodically, at select times, or after each copy is printed. Herein, color plane corrections that are made on an entire document (as disclosed in U.S. patent application Ser. No. 13/664,472) will be referred to as global color plane corrections.

Figure 11:
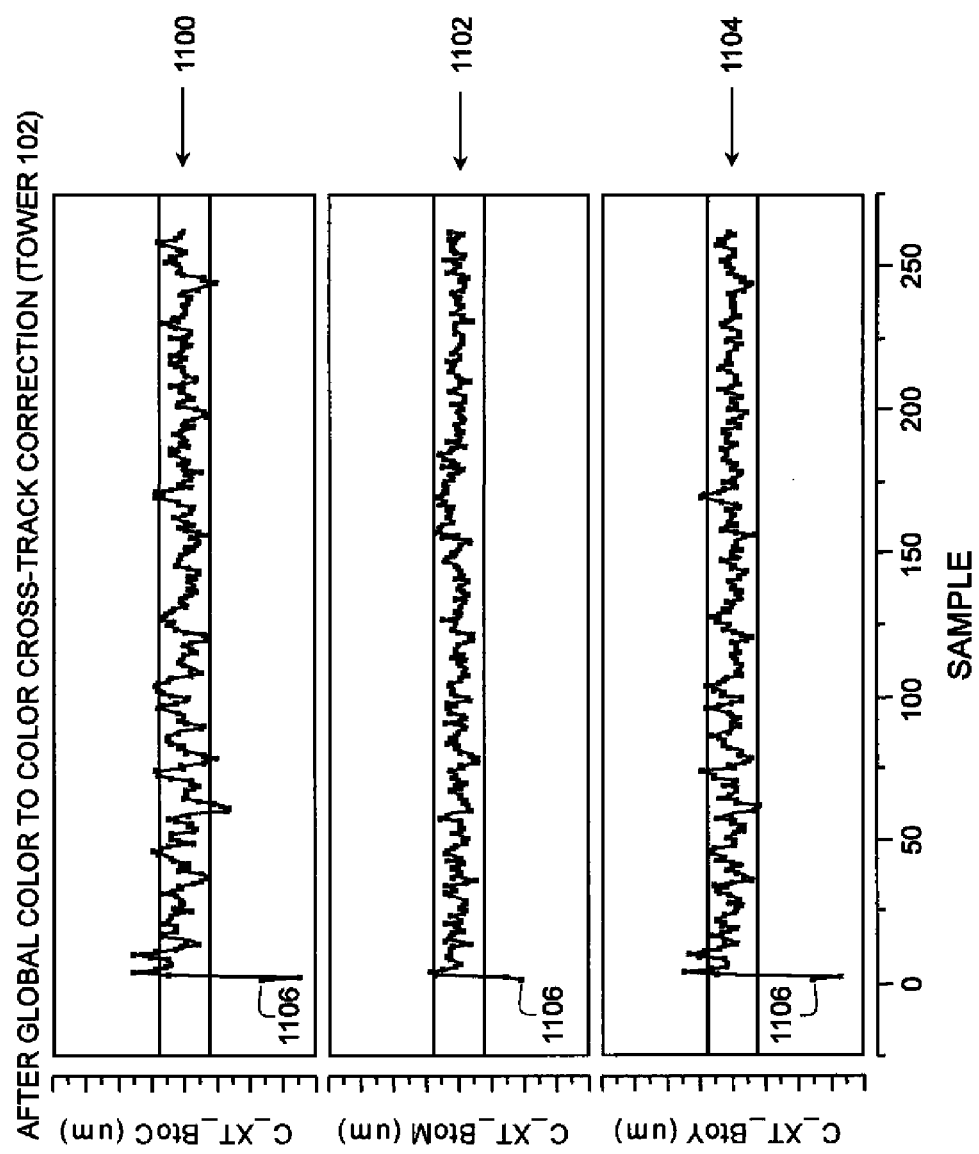
FIG. 11 depicts one example of plots of globally corrected color-to-color registration errors in the cross-track direction.
Figure 12:
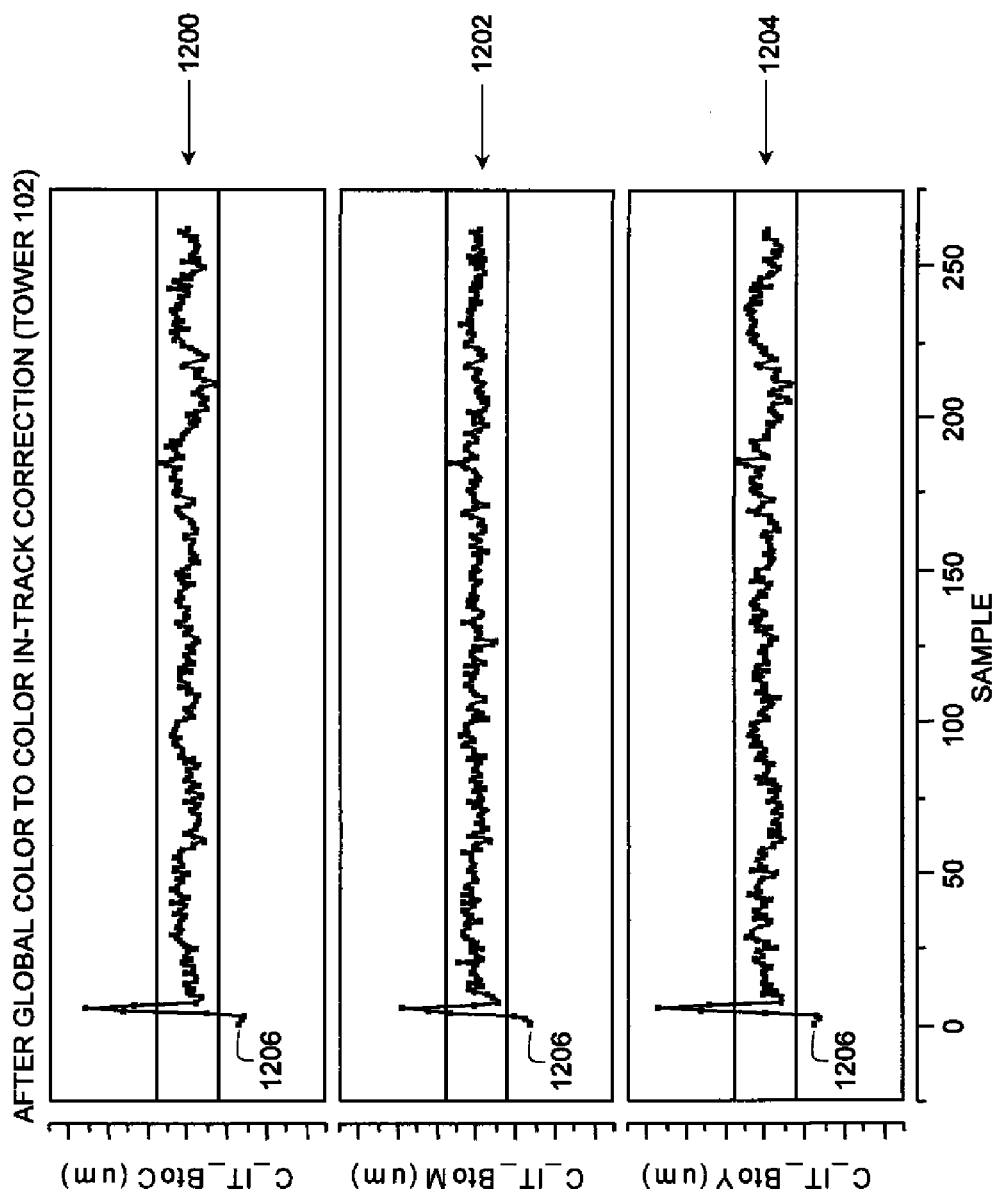
FIG. 12 depicts one example of plots of globally corrected color-to-color registration errors in the in-track direction.

Improved color-to-color registration resulting from global color plane corrections that are made as described in U.S. patent application Ser. No. 13/664,472 are shown in FIGS. 11-14. Referring now to FIG. 11, there is shown one example of plots of the globally corrected color-to-color registration errors in tower 102 in the cross-track direction, while FIG. 12 illustrates one example of plots of the globally corrected color-to-color registration errors in the in-track direction for tower 102. Plots 1100 and 1200 correspond respectively to plots 700 and 800 of the first ink color shown in FIGS. 7 and 8 after the global color to color registration corrections have been applied; plots 1102 and 1202 correspond respectively to plots 702 and 802 of the second ink color illustrated in FIGS. 7 and 8, and plots 1104 and 1204 correspond respectively to plots 704 and 804 of the third ink color depicted in FIGS. 7 and 8.

The registration errors for the examples shown in FIGS. 11-14 are determined by comparing each color plane to a reference color plane. Additionally, the print job associated with the examples shown in FIGS. 11-14 includes seven documents. Each plotted point on the plots represents one of the seven documents.

The variations in the color-to-color registrations for each document are shown in each period of the waveform, and the magnitude of the color-to-color registration errors shown in FIGS. 11-12 for tower 102 is significantly reduced compared to the registration errors shown in FIGS. 7-8. Regions 1106 and 1206 of the plots depict the color registration errors associated with the beginning of the printing of the documents in the print job. As can be seen, the color-to-color registration errors are larger compared to the later or subsequent copies of the print job. This is mostly due to the fact that the color plane correction values are not as finely tuned or updated when the earlier copies are printed compared to the later copies.

Figure 13:
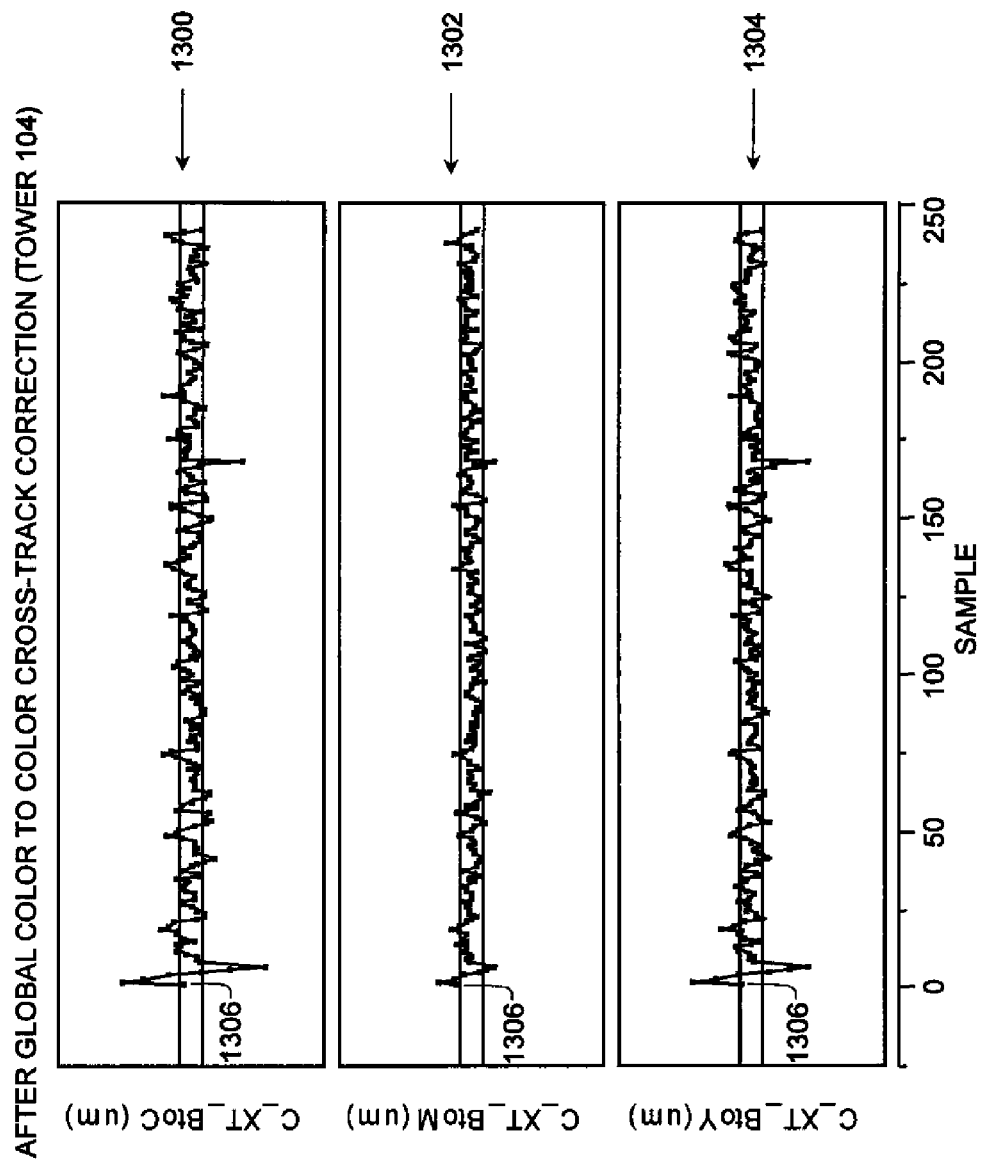
FIG. 13 depicts one example of plots of globally corrected color-to-color registration errors in the cross-track direction.
Figure 14:
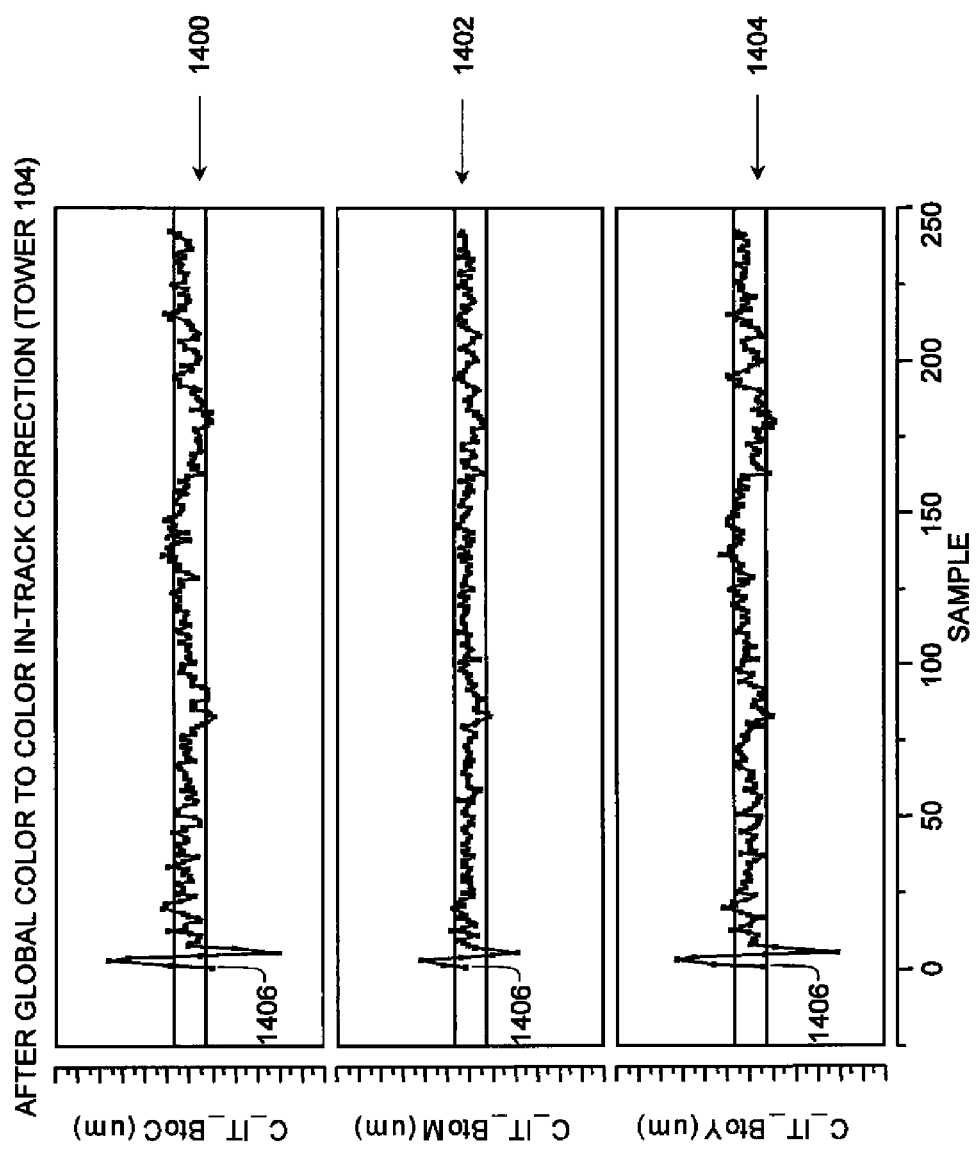
FIG. 14 depicts one example of plots of globally corrected color-to-color registration errors in the in-track direction.

FIG. 13 depicts one example of plots of the globally corrected color-to-color registration in tower 104 in the cross-track direction, while FIG. 14 illustrates one example of plots of the globally corrected color-to-color registration in tower 104 in the in-track direction according to the method disclosed in U.S. patent application Ser. No. 13/664,472. Plots 1300 and 1400 correspond respectively to plots 900 and 1000 of the first ink color shown in FIGS. 9-10; plots 1302 and 1402 correspond respectively to plots 902 and 1002 of the second ink color illustrated in FIGS. 9-10, and plots 1304 and 1404 correspond respectively to plots 904 and 1004 of the third ink color depicted in FIGS. 9-10.

The magnitude of the color-to-color registration errors shown in FIGS. 13-14 for tower 104 is significantly reduced compared to the registration errors in FIGS. 9-10. Regions 1306 and 1406 of the plots depict the color registration errors associated with the beginning of the printing of the documents in the print job. As can be seen, the color-to-color registration errors are larger compared to the later or subsequent copies of the print job. This is mostly due to the fact that the color plane correction values are not as finely tuned or updated when the earlier copies are printed compared to the later copies.

As described above, the method described in U.S. patent application Ser. No. 13/664,472 is very effective for providing color-to-color correction on a document by document basis so that there is little to no visible periodicity seen in the plots of FIGS. 11-14. The method of U.S. patent application Ser. No. 13/664,472, however does not compensate for repeatable color registration errors within each document. As discussed above, shifts and distortions need not be uniform across a document. Due to different ink laydown patterns within a document, for example, different regions of a document can exhibit different amounts of expansion and contraction. Color plane corrections that are made on a region-by-region basis within a document according to aspects of the present invention will be referred to herein as locally adjusted color plane corrections.

Figure 15:
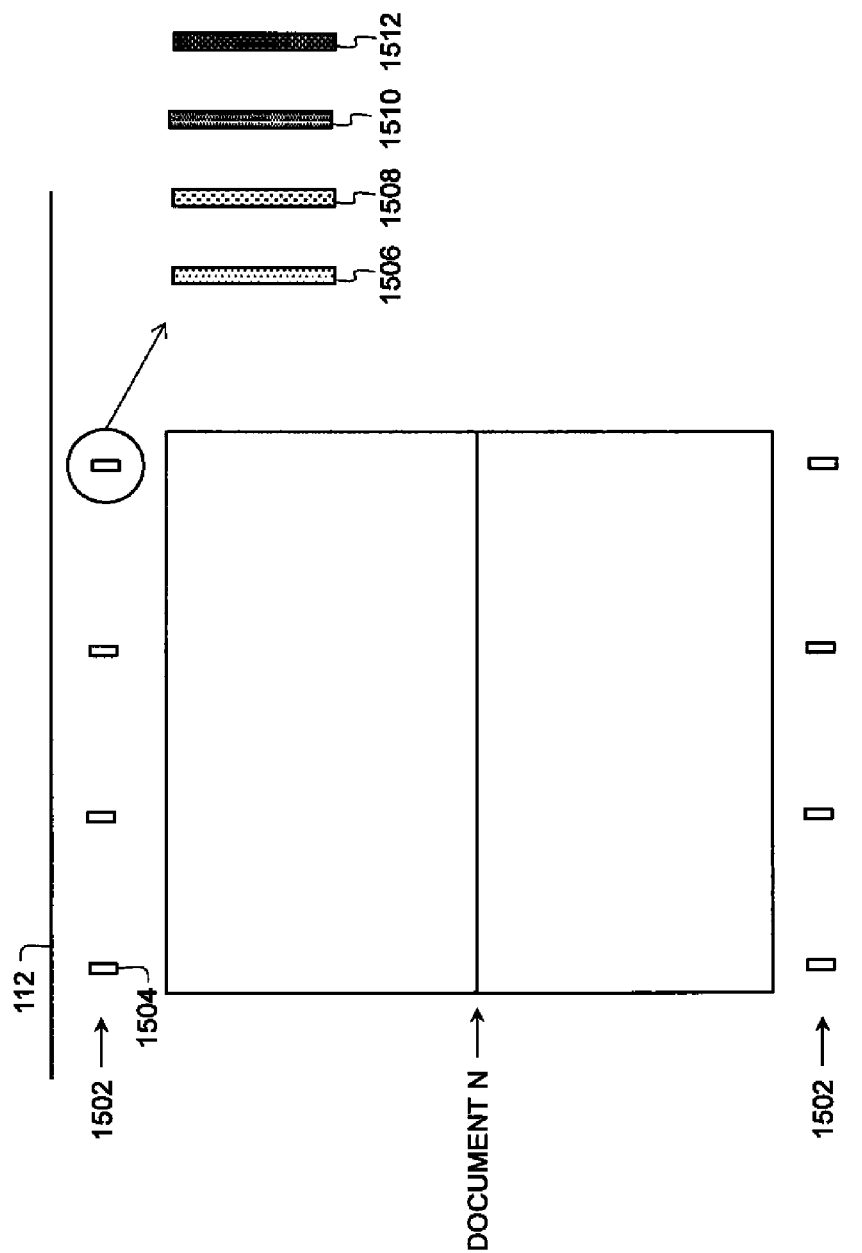
FIG. 15 depicts one example of registration marks alongside a document in the margins outside the boundaries of the document.

Referring to FIG. 15, Document N is shown on web of print medium 112. Registration marks 1504 can be located in margins 1502 outside the boundaries of Document N so that when the documents are cut from the print medium 112 after printing, there are no registration marks 1504 appearing within the documents. In other aspects of the invention, the registration marks can be located in other portions of the print medium 112. In the example shown in FIG. 15, the registration marks 1504 include patterns of dots that have been printed by different printheads. For example, element 1506 is a line of cyan dots, element 1508 is a line of magenta dots, element 1510 is a line of yellow dots and element 1512 is a line of black dots. Other registration mark configurations (cross-hairs, etc.) could alternatively be used. A quality control sensor 110 (FIG. 1) can be positioned relative to each of the two margins 1502, such that as the print medium 112 is advanced along the transport direction 114, each registration mark can be viewed as it comes into the field of view of quality control sensor 110. Signals are sent from quality control sensor 110 to processor 118 (FIG. 1) so that the actual printed positions of elements 1506, 1508, 1510, and 1512 can be obtained and compared to ideal relative positions if there were no color-to-color registration error. The difference is the color-to-color registration error, which can be separated into different types of error including translation, rotation, expansion and contraction. By having a plurality of registration marks 1504 alongside or within each document, the local color-to-color registration errors are determined for corresponding regions within each document of a print job. In other aspects of the invention, information printed within each document can be used as registration marks for measuring color-to-color registration errors.

Each time another copy of the print job is printed in the same document sequential order, a plurality of local color-to-color registration errors for one or more types of color registration errors can be determined for each document in the print job and stored in memory as a look-up table, as color registration errors, or in the form of color plane correction values, determined from the color registration errors, to be used for printing subsequent copies of the print job. The plurality of color registration errors for one of the types of color registration errors correspond to a plurality of image regions with the documents. For example, a document may comprise multiple segments in the in-track direction. In the examples shown in FIGS. 16-19, each document in a print job having seven documents has been segmented into 10 segments in the in-track direction. The documents in FIGS. 16-19 have only a single segment spanning the crosstrack direction of the document. This number of segments is not restrictive; the documents can be segmented into various numbers of segments in both the in-track and cross-track directions.

Figure 16:
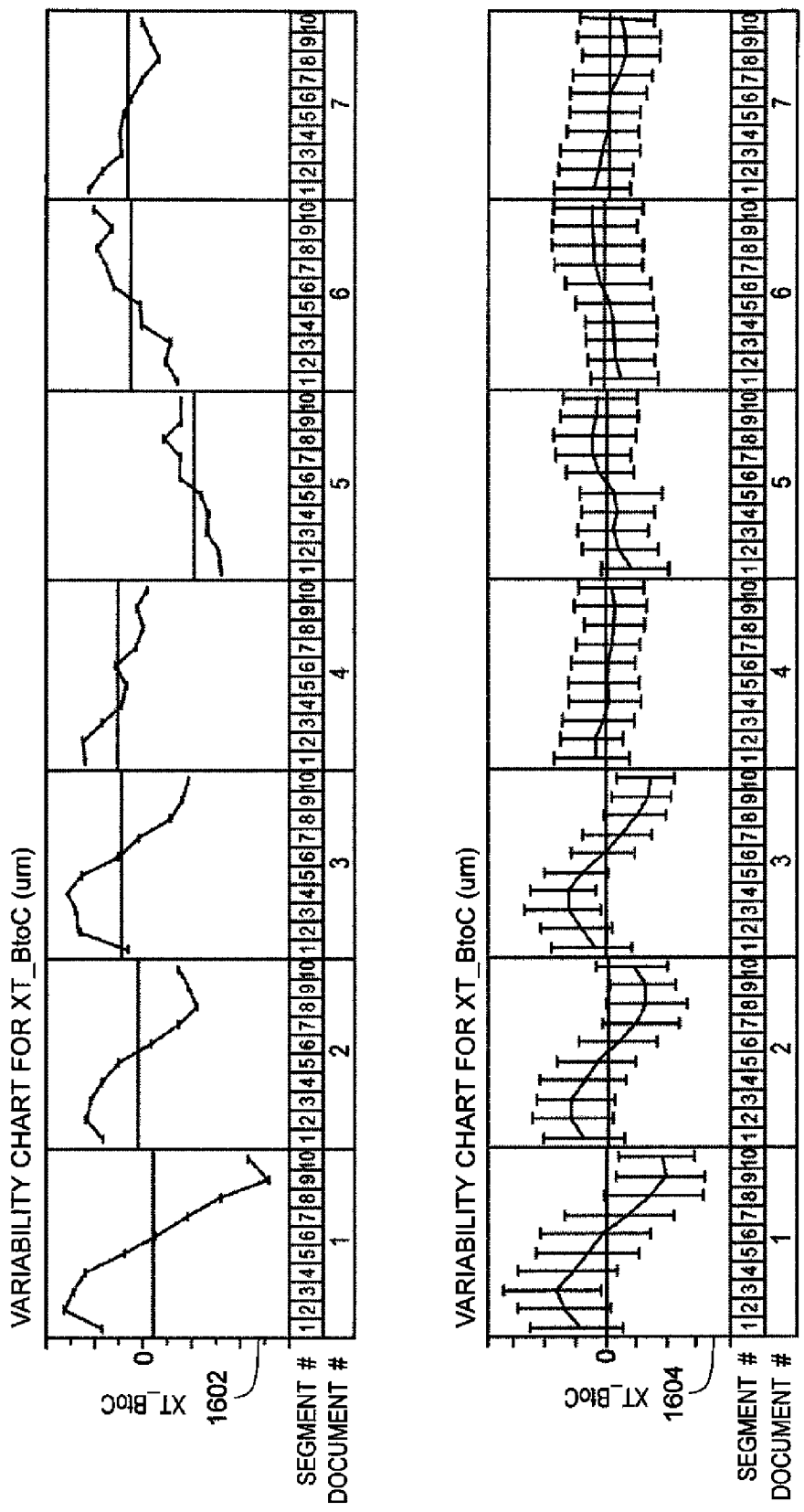
FIG. 16 depicts one example of local cross-track color-to-color registration errors for a print job including seven documents each measured in ten segments.

FIG. 16 shows a plot 1602 of cross-track black to cyan registration errors for each of the ten segments of each of the seven documents for a single copy printed in the example print job. The horizontal lines show the cross-track black to cyan registration errors averaged over all ten segments (i.e. the global color-to-color registration errors). Such averaging can include providing a measure of central tendency such as a medium or a mean of the errors, for example. For some documents, such as document 1, there is significant variability of the cross-track black to cyan registration error. For documents having significant variability, it is clearly advantageous to apply local corrections within the document, rather than a single average or global correction for the entire document. For documents such as document 5, the cross-track black to cyan registration error does not vary as much within the document. FIG. 16 also shows plot 1604 of registration errors for thirty copies of the print job. The curves drawn through plot 1604 indicate a central tendency, such as a medium or a mean of the registration errors for the thirty copies as a function of segment in each document. These curves for plot 1604 are smoother and less noisy than the registration errors measured for a single copy and shown in plot 1602. It can be advantageous to use local color-to-color registration errors measured over a plurality of copies (as shown in plot 1604) rather than local color-to-color registration errors measured for a single copy of the print job (as shown in plot 1602) in determining the local color plane correction values. The color plane correction values can be updated using different known techniques. For example, a running average of each local color plane correction value can be determined. Alternatively, a rolling window of local color plane correction values can be determined. The rolling window can include a number of local color registration values. For example, the correction values for the last five copies of the print job can be used to update the local color plane correction values. Alternatively, the local color plane correction values associated with every nth copy of the print job, such as for every third or fifth copy, can be used to update the local color plane correction values. Alternatively various algorithms can be used which update the local color plane corrections values on a non-periodic basis. Prior to updating of the local color plane correction values, various statistical tests can be applied to the new data to confirm that the printing process is stable and within normal control limits, and to confirm that the new data doesn't represent outlier data that could adversely shift the color plane correction values.

Figure 17:
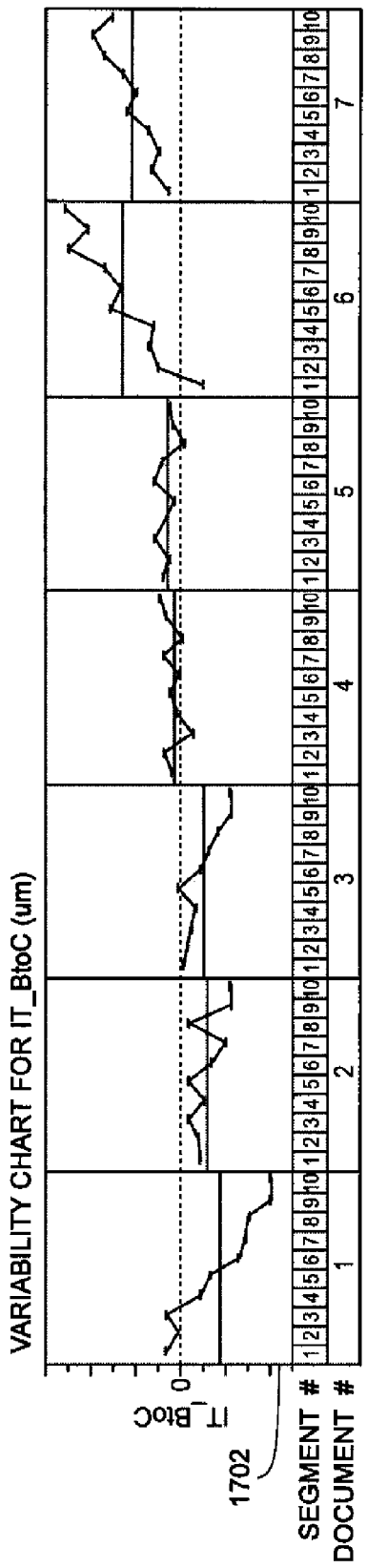
FIG. 17 depicts one example of local in-track color-to-color registration errors for a print job including seven documents each measured in ten segments.
Figure 17:
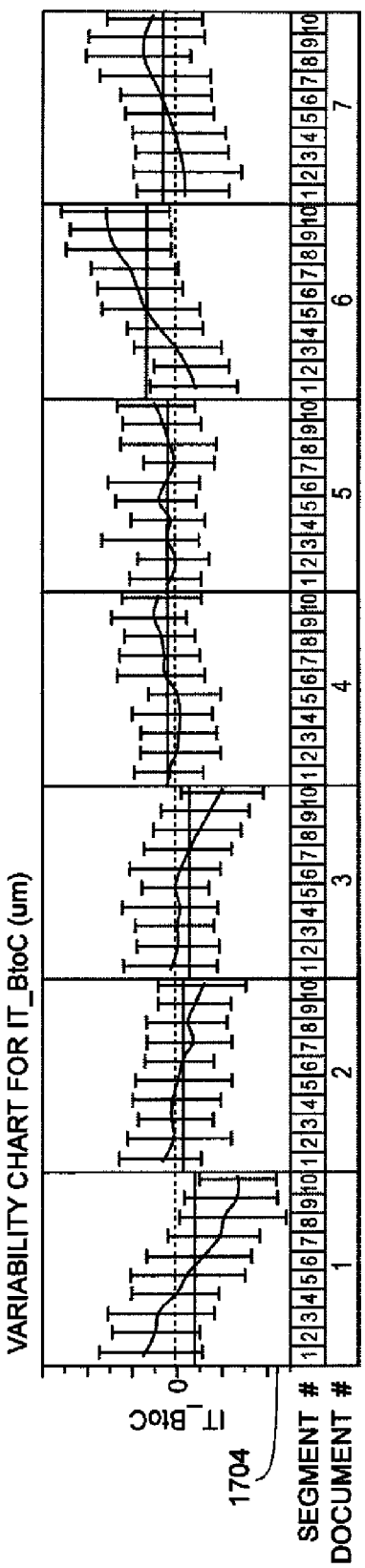
Figure 18:
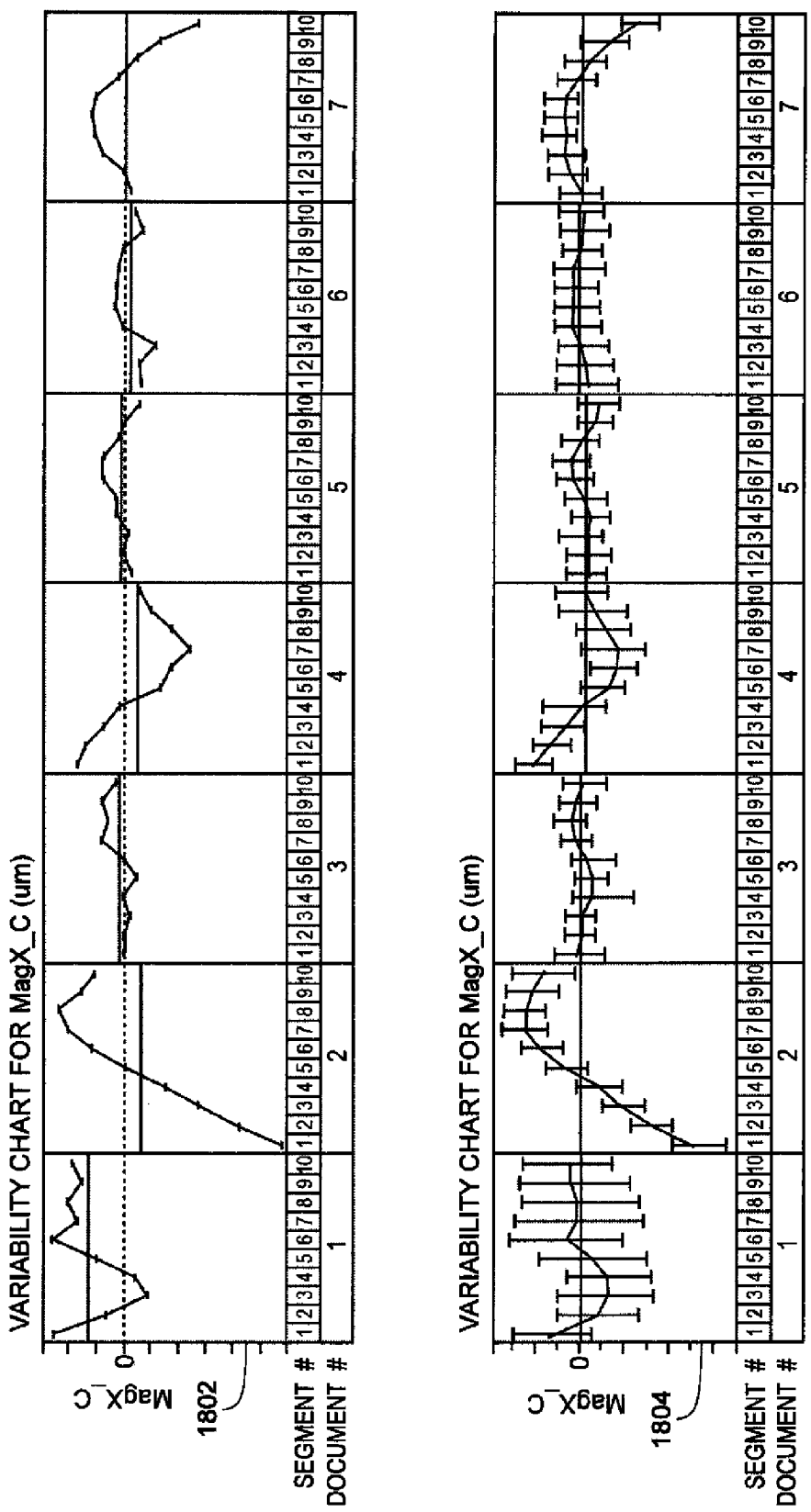
FIG. 18 depicts one example of local cross-track color-to-color magnification registration errors for a print job including seven documents each measured in ten segments.
Figure 19:
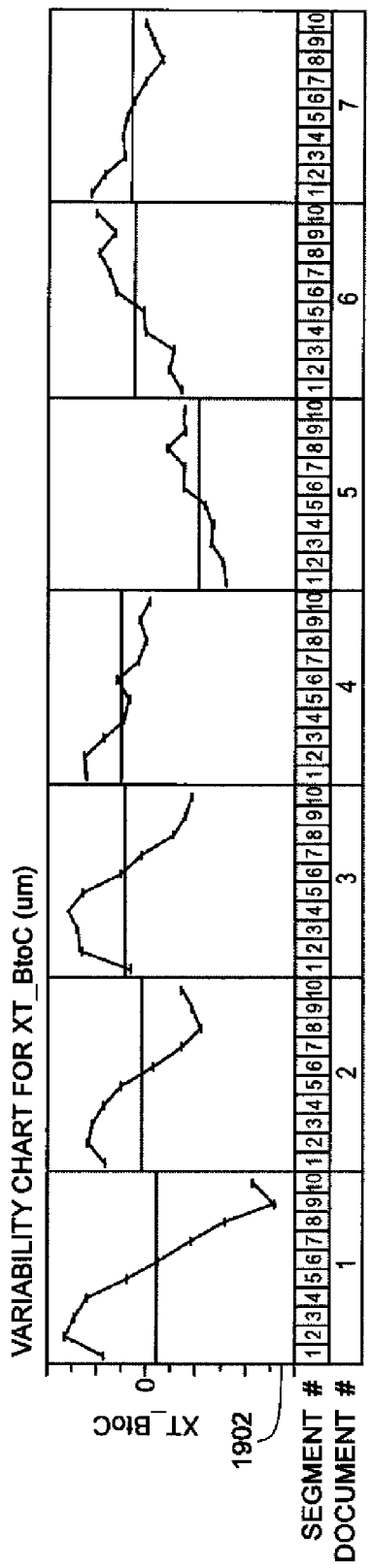
FIG. 19 depicts one example of local in-track color-to-color skew registration errors for a print job including seven documents each measured in ten segments.
Figure 19:
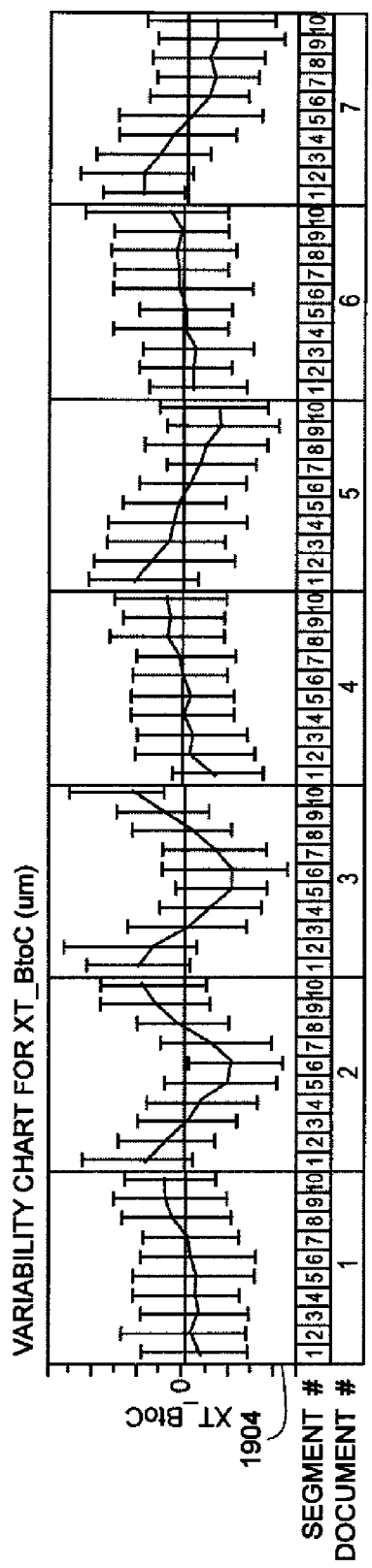

FIGS. 17-19 are similar to FIG. 16. FIG. 17 shows a plot 1702 of in-track black to cyan registration errors for each of ten segments of each of seven documents for a single copy printed in the example print job. FIG. 17 also shows a plot 1704 of in-track black to cyan registration errors for thirty copies of the example print job. FIG. 18 shows a plot 1802 of cross-track black to cyan magnification (i.e. expansion or contraction) registration errors for each of ten segments of each of seven documents for a single copy printed in the example print job. FIG. 18 also shows a plot 1804 of cross-track black to cyan magnification registration errors for thirty copies of the example print job. FIG. 19 shows a plot 1902 of in-track black to cyan skew (i.e. rotation) registration errors for each of ten segments of each of seven documents for a single copy printed in the example print job. FIG. 19 also shows a plot 1904 of in-track black to cyan skew registration errors for thirty copies of the example print job.

In FIGS. 16-19, the ten segments disposed along the in-track direction are shown as each having the same size within a document and from document to document. In alternate aspects, the number and size of the segments can vary from document to document within the repeated sequence of documents. In other aspects, the size of the plurality of segments within a document can vary from segment to segment. In some aspects, number and relative size of the segments within a document is determined based on the image content within the document. Referring again to FIG. 15, this can be accomplished by varying the placement of registration marks 1504 as a function of the printed image content in order to measure local color registration errors where such errors are most likely to occur. For example, for a document having a high print density color photograph and regions of low print density text, registration marks 1504 can be printed at locations corresponding to the top and the bottom of the photograph, as well as a number of locations between the top and the bottom. Registration marks 1504 corresponding to a high print density region can be spaced more closely than registration marks 1504 corresponding to a low print density text region. Varying the number and size of the segments permits finer segments in regions of a document having either a high density of ink coverage, or a large gradient in ink coverage, areas in which one might expect more distortion in the printed image, without requiring the same gradation of segments in regions have little or no ink coverage.

Other aspects of the invention can determine the color registration errors differently. By way of example only, a target location on the web is identified and the color registration error of each color plane is measured from the target.

Local color plane correction values for each document in the print job, for the types of color registration errors, and for each color plane are determined and stored in memory. For example, the global and local color plane correction values can be stored in a look-up table in storage device 120 (FIG. 1). In a particular example, local color correction values are determined for three different types of color registration errors, translation, rotation, and stretch or contraction. The local color registration errors are also determined for the in-track and cross-track directions. So for each document printed using four color planes, eighteen local color correction values are determined and stored in for each segment in the respective locations in the look-up table. The color correction values can be any value, including zero.

Four different ink colors are used in the example. The four ink colors can be black, magenta, cyan, and yellow, with black serving as the reference color. Thus, the color correction values are determined for black-to-cyan (B-C), black-to-magenta (B-M), and black-to-yellow (B-Y) for one or more of the types of registration errors.

As described earlier, local color correction values are determined for each segment of each document in a print job, for each type of color registration error, and for each color plane in a document. Thus, the color correction values are specific to each segment of each document. For example, the color correction value determined for segment 5 of document 1 regarding translation in the cross-track direction for black-to-cyan (B-C) can be different from the color correction value determined for segment 2 of document 7 for the same type of color registration error (i.e., translation in the cross-track direction for black-to-cyan (B-C)).

Local color-to-color registration corrections within each document should be sufficiently smoothly varying and at a small enough rate of change so that image artifacts are not introduced for neighboring segments. Methods for providing smoothly varying corrections can include using linear interpolation to adjust local corrections for adjacent segments. Interpolation with curvature can be used if needed. A smooth curve, such as a spline function (piecewise defined polynomial functions having matching values and matching slopes at segment boundaries), can be used to provide gradually varying local color correction values. Smoothly varying functions can be particularly useful when correcting the first few copies of the print job, before the natural smoothing caused by averaging (as discussed above) occurs. If there is minimal variation in the local registration errors of a particular document in a print job, such is in document 5 of FIG. 17 or document 6 of FIG. 18, some aspects of the invention can forego making local color plane corrections for those documents, but rather use a global color plane correction for all segments of such pages.

Figure 20:
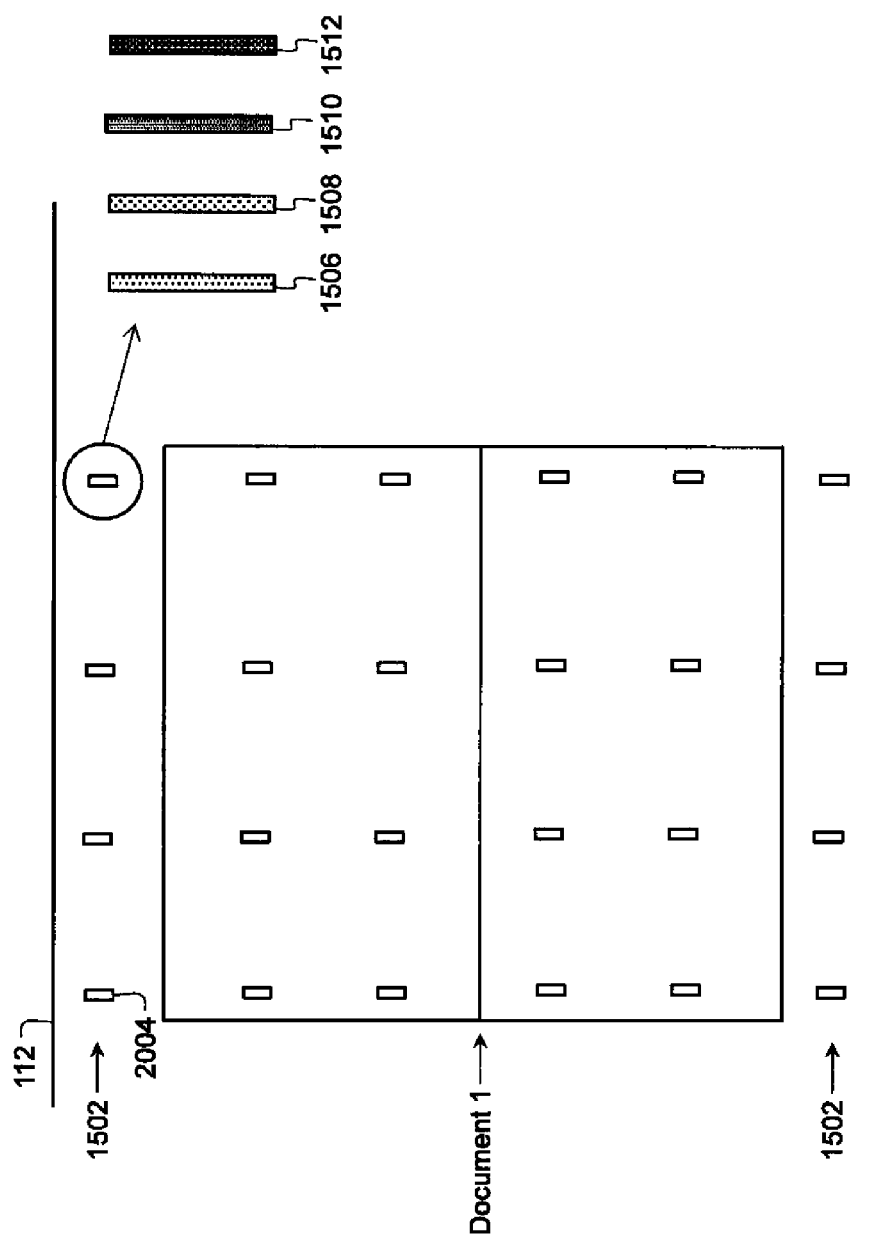
FIG. 20 depicts one example of registration marks alongside a document in the margins outside the boundaries of the document, as well as inside the boundaries of the document.

In order to obtain better registration across the width of the document it can be useful to have multiple segments in the cross-track direction as well. Referring to FIG. 20, Document N is shown on web of print medium 112. Registration marks 2004 are located in margins 1502 outside the boundaries of Document N. In addition, registration marks 2006 are located within the boundaries of the printed document. Registration marks 2006 would typically be placed inside the printed document only for a few copies (the first copy plus a few successive copies or a few periodic copies) for improving the registration in the print job. Such documents with registration marks on them could subsequently be discarded. In addition, several quality control sensors 110 (FIG. 1) would need to be positioned to view the registration marks as they pass while print medium 112 is being advanced.

In some aspects of the invention, global color plane corrections are not used, but rather the local color plane corrections are applied directly. Such a method for performing color-to-color correction for printing multiple copies of a print job having one or more documents can be described as follows: Receive a print job including one or more documents and a plurality of color planes. Define a plurality of segments for at least one document of the print job. Print a first copy of the print job using a plurality of printheads to print the plurality of color planes. Determine a first plurality of color registration errors produced during the printing of the first copy of the at least one document of the print job on a segment by segment basis. For each segment of the at least one document in the print job, use a processor to determine a local color plane correction value for at least one color plane error produced during the printing of the first copy of the print job based on the first plurality of color registration errors. Print a second copy of the print job using the local color plane correction values for the at least one document in the print job.

In other aspects of the invention, global color plane corrections are made first, and then local color plane corrections are implemented as an adjustment to the global color plane corrections. Such a method for performing color-to-color correction for printing multiple copies of a print job having one or more documents can be described as follows: Print a first copy of the print job having a plurality of color planes. Determine a first plurality of color registration errors produced during the printing of the first copy of the print job. For each document in the print job, use a processor to determine a global color plane correction value for each color plane error produced during the printing of the first copy of the print job based on the first plurality of color registration errors. For each document in the print job, use the processor to determine a first plurality of local color plane correction values for each color registration error produced during the printing of the first copy of the print job, where each of the first plurality of local color plane correction values corresponds to one of the first plurality of color registration errors. For each document in the print job, use the processor to locally adjust the global color plane correction value for each of the plurality of color planes based on the first plurality of local color plane correction values. Print a second copy of the print job using the locally adjusted global color plane correction values for each document in the print job. This "second copy" does not necessarily have to be the copy printed after the first copy of the print job. For example, for the copy printed immediately following the first copy of the print job the global color plane corrections can be used, and for a copy printed subsequent to that copy, the locally adjusted global color plane corrections can be used.

Figure 21:
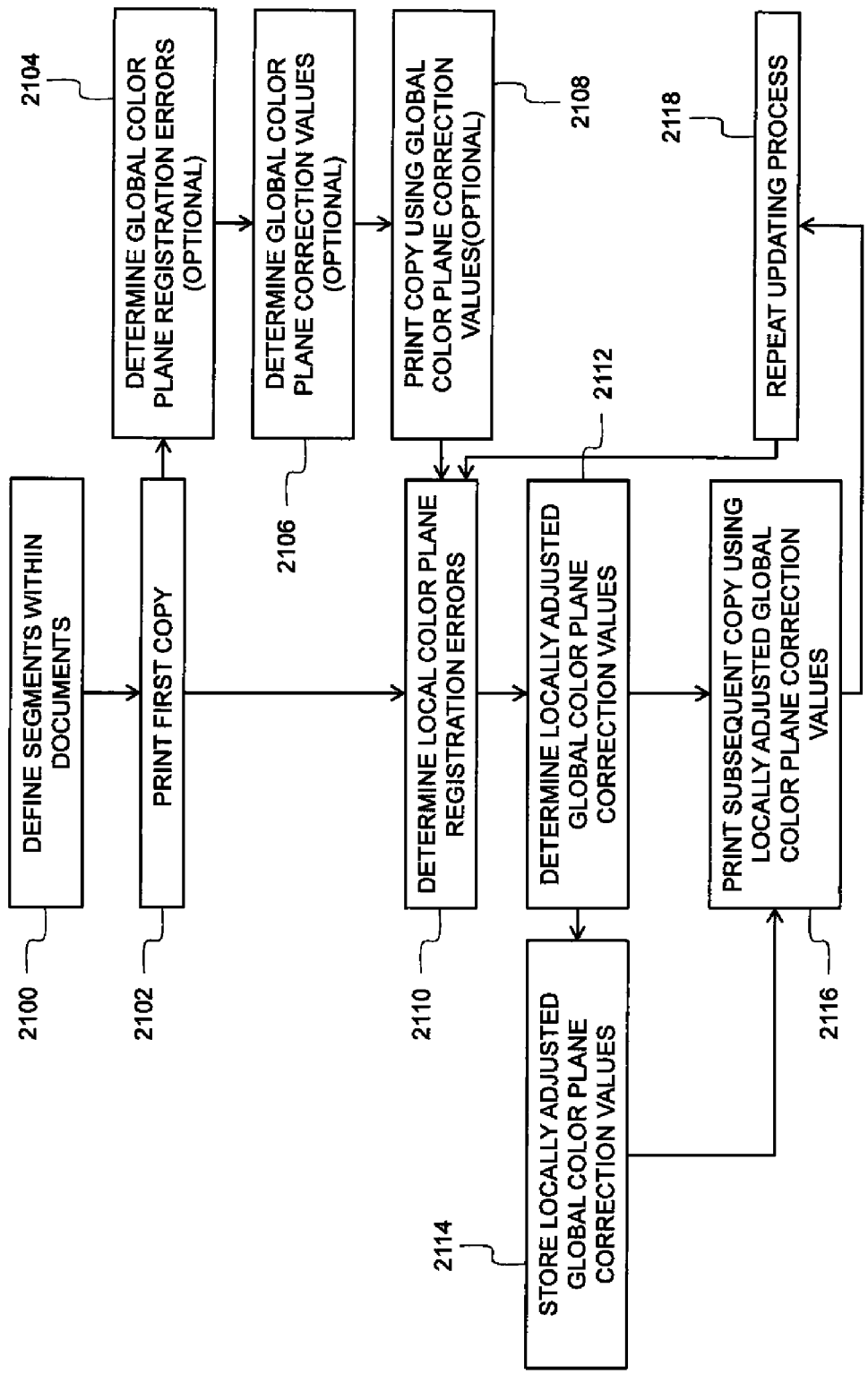
FIG. 21 is a flowchart for a method for printing multiple copies of a print job according to aspects of the invention.

FIG. 21 is a flowchart for a method for correction color-to-color registration errors according to an aspect of the invention. At step 2100 local segments are defined within the documents of the print job. At step 2102 the first copy of the print job is printed. Steps 2104, 2106 and 2108 on global color plane registration errors can be optional in some aspects of the invention. At step 2104 global color plane registration errors are determined. At step 2106 global color plane correction values for each document are determined. At step 2108 a copy of the print job can be printed using the global color plane correction values. At step 2110 local color plane registration errors are determined. At step 2112 local color plane registration corrections are determined. If global color plane correction values have been determined, the local color plane correction values can be determined as an adjustment to the global color plane correction values for each local segment. In this aspect of the invention, the local color plane correction values are called locally adjusted global color plane correction values. In other aspects of the invention, steps 2104, 2106, and 2108 are optional. In these aspects of the invention, local color plane registration errors are determined and local color plane correction values produced for each local segment in the documents of the print job with no global color plane correction values being used. At step 2114 the local color plane correction values or the locally adjusted global color plane correction values are stored in the storage device. At step 2116 a subsequent copy of the print job is printed using the local color plane correction values or the locally adjusted global color plane correction values. At step 2118, the local color plane correction values or the locally adjusted global color plane correction values are updated using the local color plane registration errors for the printing of the subsequent copy. The steps of the method shown in FIG. 21 can be performed by one or more processors. The steps can be performed by the same processor or by different processors.

Figure 22:
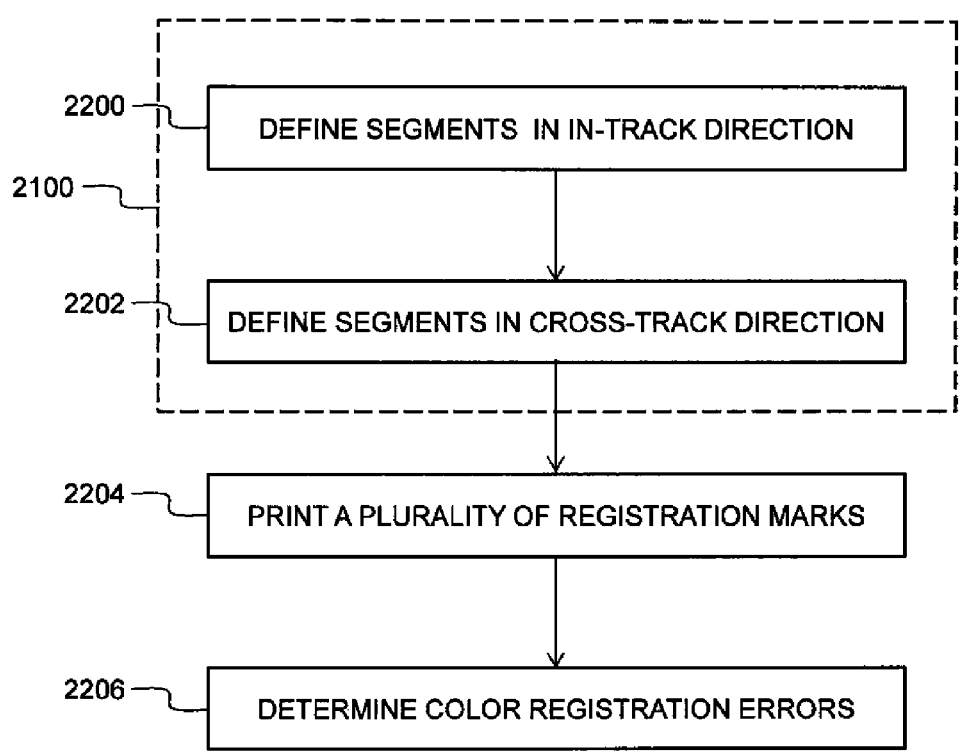
FIG. 22 is a flowchart for a method for determining color-to-color registration errors.

FIG. 22 shows a flowchart for a method for determining color plane registration errors. At Step 2200, local segments are defined for each document in the print job in the in-track direction. At Step 2202, local segments are defined for each document in the print job in the cross track direction. At Step 2204, a plurality of registration marks, at least one for each local segment, is printed on the print medium. As discussed earlier, the registration marks can be printed in the margin area of the print medium or in the printed document area. At Step 2206, the color registration errors are determined using the printed registration marks. Each of the local registration marks, corresponding to each of the local segments, produces a local color registration error. The local color plane registration errors for all the local segments of a document can be combined to produce global color plane registration errors. The steps of the method shown in FIG. 22 can be performed by one or more processors. The steps can be performed by the same processor or by different processors.

In some aspects of the invention, the local color plane correction values determined during the printing of a print job are saved in the storage device for use at a later time. This can be useful, for example, to a book printer. The local color plane correction values determined during the printing of a batch of a certain book are stored. When a second print job comprising an additional batch of the same book is ordered at a later date, the stored set of local color plane correction values can be retrieved from memory and can be used during the printing of the additional batch. The retrieved local color plane correction values can even be used for the printing of the first copy of the book in this additional batch so that the color to color registration of even the first copy of the book is enhanced through the use of the local color plane correction values. After the printing of the second print job, the local color plane correction values can be updated and refined for subsequent use.

The local color plane correction values are effective in improving the color to color registration because the documents are printed in the same sequence each time. In the first print job, comprised of printing multiple copies of a book, the first document of a copy of the book would be printed following the last document of the previous copy of the book. The local color plane correction values for the first document in the book, therefore, are appropriate when the first document of the book follows the printing of the last several documents of the book. In some aspects of the invention, when a second print job calls for printing additional copies of the book, the printer controller will not only retrieve the local color plane correction values from memory, but will also begin the printing process by preceding the printing of the first document of the book with printing a sequence of the last several documents in the book. In this way, the first document of the book is printed in the same sequence as it was when the local color plane correction values were determined. The result is enhanced color to color registration for the first page of the book. The documents which the controller caused to be printed prior to the first document of the second print job can then be diverted by the controller or other means to waste after they are printed.

In a similar manner, the local color plane correction values determined for improving the color to color registration when printing multiple copies of one print job can be useful for improving the color-to-color registration printing of multiple copies of a second print job in which the information content is not identical but is substantially similar to image content in the first print job. For example, the first print job and the second print job may be different versions of a physics textbook in which there are some notation changes for some of the parameters used in the textbook. Another example could be two print jobs for printing copies of an illustrated children's book in two different languages in which none of the illustrations were changed between the two versions. The text changes between the two print jobs might be expected to result in little change of the color-to-color registration as such text changes have small effect on the overall ink coverage levels in one or more of the color or image planes that can alter the local expansion or shrinkage of the print medium. The effectiveness of the invention in using the local color plane correction values determined in a first print job in reducing color-to-color registration errors of a second print job is dependent on how significant the content changes are from the first print job to the second print job in terms of their propensity to cause a particular type of color registration error. In particular, the overall ink coverage levels in one or more of the color or image planes that can alter the local expansion or shrinkage of the print medium is dependent on information content changes; the effectiveness of the method being degraded if significant local regions of the print medium undergo changes in the expansion or shrinkage of the print medium from one print job to another.

In some aspects of the invention, when a second print job is received that is similar but not identical to a first print job, the processor is used to evaluate or compute an amount of difference between the corresponding documents in the first print job and second print job. If the amount of difference is less than a predetermined threshold amount, the local color plane correction values determined during the printing of the first print job are used to enhance the color to color registration during the printing of the second print job. If the identified difference between the first print job and the second print job exceeds the predetermined threshold, the second print job is printed without using the local color plane correction values of the first print job. In some aspects of the invention, the evaluation of the differences between the corresponding documents in the first print job and second print job can include identifying a sub-sequence from the sequence of documents in the print jobs that is the same in both the first and the second print jobs, while another sub-sequence from the sequence of documents in the print jobs that differs significantly between the first and the second print jobs. In such aspects, the processor can use the local color plane correction values determined during the first print job, for the sub-sequence from the sequence of documents in the print jobs that is the same in both the first and the second print jobs, for the printing of the same sub-sequence in the second print job. For the identified sub sequence of the second print job that differed significantly from the sub-sequence of the first print job, the local color plane correction values determined from the first print job are not used.

Figure 23:
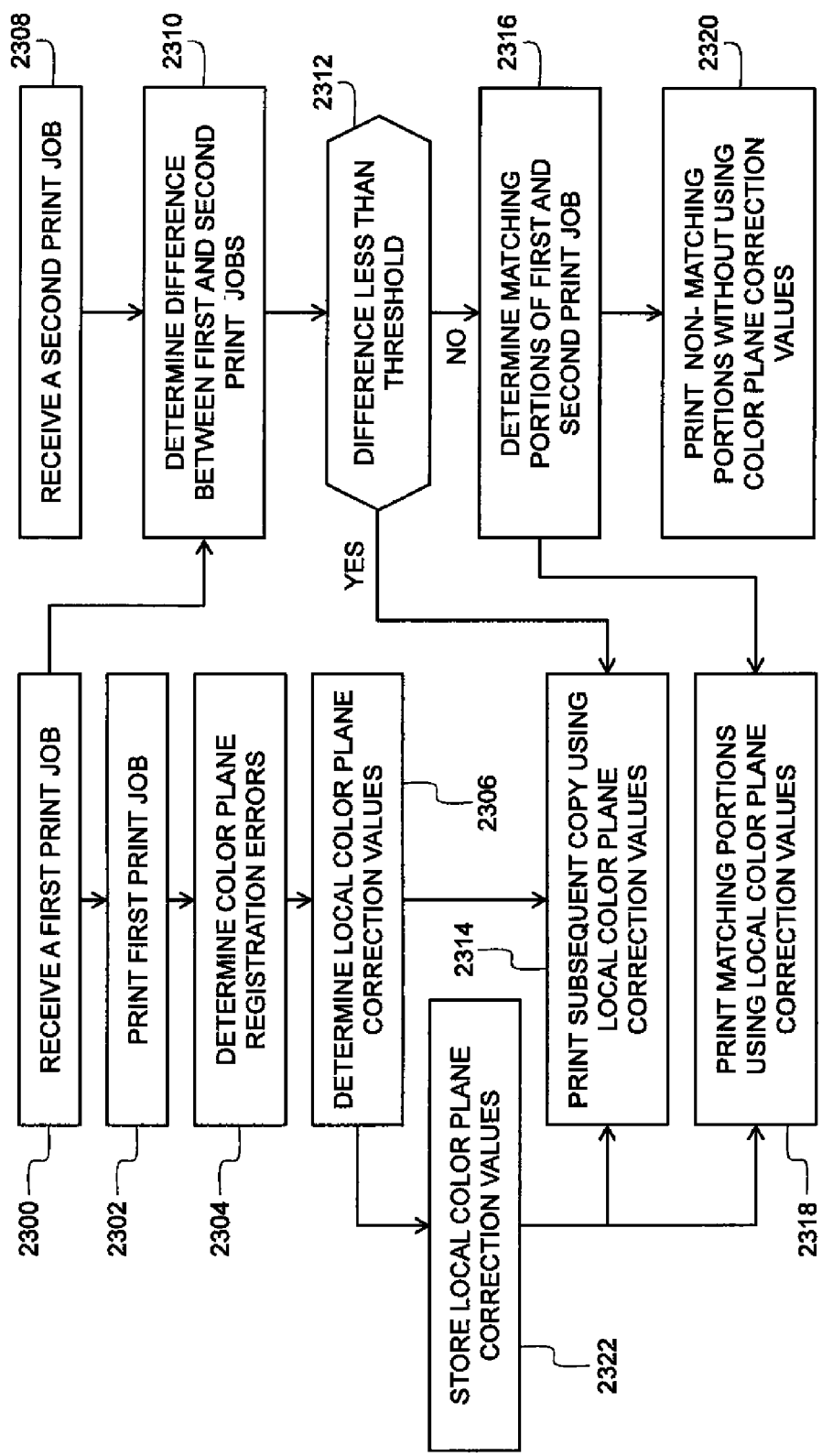
FIG. 23 is a flowchart for a method for printing multiple print jobs according to an aspect of the invention.

FIG. 23 shows a flowchart for a method for printing multiple print jobs. The print jobs can have some matching documents and some differing documents. The differences can be within portions of one or more documents of the print job. At Step 2300, a first print job is received and printed using no color corrections at Step 2302. The color plane registration errors for the first print job are determined at Step 2304, and local color plane correction values are produced at Step 2306. At Step 2308, a second print job is received. At Step 2310, differences between the first and second print job are computed. At Step 2312, the difference is compared to a predetermined threshold. If the difference is less than the threshold, control flows to Step 2314 where the second job is printed using the local color plane correction values produced in Step 2306 or stored in storage device. If the difference is greater than the threshold, the second print job can be printed without using the local color plane correction values, or control can flow to Step 2316 where matching and non-matching portions of the first and second print jobs are determined. At Step 2318, matching portions of the second print job can be printed using the local color plane correction values from the first print job. At Step 2320, the non-matching portions are printed without using the color plane correction values from the first print job. The steps of the method shown in FIG. 23 can be performed by one or more processors. The steps can be performed by the same processor or by different processors.

The invention is useful not only for print jobs in which multiple copies of a sequence of one or more documents are printed where the content of each copy is identical to the content of each other copy. It is also useful for print jobs in which at least a portion of the information content differs from copy to copy, or version to version. For example, a report that is sent to multiple recipients can vary the name and address of the recipient in each printing of the report while maintaining the consistency of the rest of the information to be printed. Examples of such information include, but are not limited to, books, magazines, reports, and transactions. For such print jobs, the effectiveness of the invention in reducing color to color registration errors is dependent on how significant the content changes are from version to version. In particular, the overall ink coverage levels in one or more of the color or image planes that can alter the local expansion or shrinkage of the print medium is dependent on information content changes; the effectiveness of the method being degraded if significant local regions of the print medium undergo changes in the expansion or shrinkage of the print medium from one version to another. Some aspects of the invention use a processor is used to evaluate or compute an amount of version to version differences between the corresponding documents of the different copies. If the amount of difference is less than a predetermined threshold amount, the local color plane correction values determined during the printing of the initial versions are used to enhance the color to color registration during the printing of the later versions. If the identified difference between the versions exceeds the predetermined threshold, the later versions are printed without using the local color plane correction values of the initial versions.

The predetermined thresholds can be a numerical measure of difference in content, such as 5% or 10%, determined empirically or set by a user for a particular print job. In another aspect of the invention, only information in regions with high laydown of ink is used to determine whether the threshold is exceeded.

A method for performing color-to-color correction for printing multiple copies of a print job having one or more documents, comprises printing a first copy of the print job using a plurality of color planes, determining a first plurality of color registration errors produced during the printing of the first copy of the print job, for each document in the print job, using one or more processors to: i) determine a global color plane correction value for each color plane error produced during the printing of the first copy of the print job based on the first plurality of color registration errors; ii) determine a first plurality of local color plane correction values for each color registration error produced during the printing of the first copy of the print job, wherein each of the first plurality of local color plane correction values corresponds to one of the first plurality of color registration errors; and iii) locally adjust the global color plane correction value for each of the plurality of color planes based on the first plurality of local color plane correction values; and printing a second copy of the print job using the locally adjusted global color plane correction values for each document in the print job.

The method can further comprise storing the plurality of locally adjusted color plane correction values in processor accessible memory for printing subsequent copies of the print job; determining a second plurality of color registration errors produced during the printing of the second copy of the print job; for each document in the second copy of the print job, using a processor to determine a second plurality of local color plane correction values for each second color registration error produced during the printing of the second copy of the print job, wherein each of the second plurality of local color plane correction values corresponds to one of the second plurality of color registration errors; using a processor to update each stored locally adjusted global color plane correction value using the respective second local color plane correction value associated with the printing of the second copy of the print job; and printing a subsequent copy of the print job using the updated locally adjusted global color plane correction values for each document in the print job.

The method can further comprise storing the updated locally adjusted global color plane correction values in processor accessible memory for printing subsequent print jobs. Using a processor to update each stored locally adjusted global color plane correction value can further comprise periodically or non-periodically updating each of the stored locally adjusted global color plane correction values using the respective local color plane correction values associated with the printing of two or more subsequent copies of the print job or updating each of the stored locally adjusted global color plane correction values after each subsequent print job using the respective local color plane correction values associated with the printing of the subsequent copy of the print job.

Using a processor to update each stored locally adjusted global color plane correction value can further comprise determining an average of the local color plane correction values associated with the first and second copies of the print job. Periodically updating each of the stored locally adjusted global color plane correction values can further comprise, for each document in the print job and for each type of color plane correction value, using a processor to determine an average of the local color plane correction values using respective local color plane correction values associated with a predetermined number of subsequent copies of the print job.

Updating each of the stored locally adjusted global color plane correction values can further comprise, for each document in the print job and for each type of color plane correction value, using a processor to compute a rolling average of the local color plane correction values using the respective local color plane correction values associated with the subsequent copies of the print job.

The color registration errors can include at least one of the following types: translation of the color planes, skew of the color planes, rotation of the color planes, or magnification of the color planes, or combinations thereof. A first plurality of color registration errors produced during the printing of the first copy of the print job is used to determine a plurality of color registration errors for each of the at least one type of color registration errors with respect to a reference color plane. Determining a first plurality of registrations errors can further include defining local segments for the documents in the print job in the in-track or the cross-track direction, printing a plurality of registration marks corresponding to the defined local segments for each color plane, and using a processor to measure the registration errors based on the corresponding each of the plurality of registration marks for each color plane.

The plurality of registration marks can be printed in a margin area of the print medium such that the printed registration marks lay outside the printed document portion of the print job. Defining local segments can comprise determining regions of high ink laydown and low ink laydown and defining more local segments in high ink laydown regions than in low ink laydown regions. Locally adjusting the global color plane correction values can further includes smoothing the local adjustments to provide smoothly varying locally adjusted global color correction values.

A printing system for printing multiple copies of a print job having one or more documents can comprise a plurality of printheads adapted to print on a print medium, wherein each of the plurality of printheads prints each of a plurality of color planes of a first copy of the print job; one or more processors to:

i) determine a first plurality of color registration errors produced during the printing of the first copy of the print job;

ii) determine global color plane correction values for each document of the first copy of the print job based on the first plurality of color registration errors;

iii) determine a first plurality of local color plane correction values for each color registration error produced during the printing of the first copy of the print job, wherein each of the first plurality of local color plane correction values corresponds to one of the first plurality of color registration errors; and iv) locally adjust the global color plane correction values for each document based on the first plurality of local color plane correction values.

The plurality of printheads prints a second copy of the print job using the locally adjusted global color plane correction values for each document in the print job. The printing system can further comprise a storage device to store the plurality of locally adjusted global color plane correction values for printing subsequent copies of the print job.

A processor can be used to determine a second plurality of color registration errors produced during the printing of the second copy of the print job, determine a second plurality of local color plane correction values for each second color registration error produced during the printing of the second copy of the print job, wherein each of the second plurality of local color plane correction values corresponds to one of the second plurality of color registration errors, and update each stored locally adjusted global color plane correction value using the respective second local color plane correction value associated with the printing of the second copy of the print job. The plurality of printheads prints a subsequent copy of the print job using the updated locally adjusted global color plane correction values for each document in the print job.

The storage device stores the updated locally adjusted global color plane correction values in processor accessible memory for printing subsequent print jobs. A processor can periodically or non-periodically update each of the stored locally adjusted global color plane correction values using the respective local color plane correction values associated with the printing of two or more subsequent copies of the print job. A processor can update each of the stored locally adjusted global color plane correction values after each subsequent print job using the respective local color plane correction values associated with the printing of the subsequent copy of the print job. The stored locally adjusted global color plane correction values can be updated using an average of the local color plane correction values associated with the first and second copies of the print job. The average of the local color plane correction values can be computed using respective local color plane correction values associated with a predetermined number of subsequent copies of the print job. A rolling average of the local color plane correction values using the respective local color plane correction values associated with the subsequent copies of the print job can also be computed.

The types of color registration errors can include translation of the color planes, skew of the color planes, rotation of color planes, or magnification of the color planes, or combinations thereof. A processor can be used to determine a plurality of color registration errors for each of the at least one type of color registration errors with respect to a reference color plane.

The plurality of printheads can print a plurality of registration marks in a margin area of the print medium such that the printed registration marks lie outside the printed document portion of the print job.

A processor can be used to smooth the local adjustments to the global color correction values to provide smoothly varying locally adjusted global color correction values.

In another aspect of the invention, a method for performing color-to-color correction for printing multiple copies of a print job having one or more documents can comprise printing a first copy of the print job using a plurality of color planes, determining a first plurality of color registration errors produced during the printing of the first copy of the print job, for each document in the print job, using a processor to determine a first plurality of local color plane correction values for each color registration error produced during the printing of the first copy of the print job, wherein each of the first plurality of local color plane correction values corresponds to one of the first plurality of color registration errors, and printing a second copy of the print job using the local color plane correction values for each document in the print job.

The method can include storing the plurality of local color plane correction values in processor accessible memory for printing subsequent print jobs. A second plurality of color registration errors produced during the printing of the second copy of the print job can be determined. For each document in the second copy of the print job, the processor can be used to determine a second plurality of local color plane correction values for each second color registration error produced during the printing of the second copy of the print job, wherein each of the second plurality of local color plane correction values corresponds to one of the second plurality of color registration errors. Each stored local color plane correction value can be updated using the respective second local color plane correction value associated with the printing of the second copy of the print job. A subsequent copy of the print job can be printed using the updated local color plane correction values for each document in the print job. The updated local color plane correction values can also be stored in processor accessible memory for printing subsequent print jobs.

Updating each stored local color plane correction value can comprise using the processor to periodically or non-periodically update each of the stored local color plane correction values using the respective local color plane correction values associated with the printing of two or more subsequent copies of the print job. Update each stored local color plane correction value can comprise using the processor to update each of the stored local color plane correction values after each subsequent print job using the respective local color plane correction values associated with the printing of the subsequent copy of the print job. Updating each stored local color plane correction value can be performed by determining an average of the local color plane correction values associated with the first and second copies of the print job. The processor can be used to periodically update each of the stored local color plane correction values. For each document in the print job and for each type of color plane correction value, an average of the local color plane correction values is determined using respective local color plane correction values associated with a predetermined number of subsequent copies of the print job. In another aspect of the invention, for each document in the print job and for each type of color plane correction value, a rolling average of the local color plane correction values is computed using the respective local color plane correction values associated with the subsequent copies of the print job.

In another aspect of the invention, a printing system for printing multiple copies of a print job having one or more documents can comprise a plurality of printheads adapted to print on a print medium, wherein each of the plurality of printheads prints each of a plurality of color planes of a first copy of the print job, a processor to determine a first plurality of color registration errors produced during the printing of the first copy of the print job; and to determine a first plurality of local color plane correction values for each document of the print job, wherein each of the first plurality of local color plane correction values corresponds to one of the first plurality of color registration errors, and the plurality of printheads printing a second copy of the print job using the local color plane correction values for each document in the print job. A storage device can be used to store the plurality of local color plane correction values for printing subsequent copies of the print job.

The processor can be used to determine a second plurality of color registration errors produced during the printing of the second copy of the print job; determine a second plurality of local color plane correction values for each second color registration error produced during the printing of the second copy of the print job, wherein each of the second plurality of local color plane correction values corresponds to one of the second plurality of color registration errors; and update each stored local color plane correction value using the respective second local color plane correction value associated with the printing of the second copy of the print job. The plurality of printheads prints a subsequent copy of the print job using the updated local color plane correction values for each document in the print job. The storage device can be used to store the updated local color plane correction values in processor accessible memory for printing subsequent print jobs.

The processor can be used to periodically or non-periodically update each of the stored local color plane correction values using the respective local color plane correction values associated with the printing of two or more subsequent copies of the print job. The processor can update each of the stored local color plane correction values after each subsequent print job using the respective local color plane correction values associated with the printing of the subsequent copy of the print job. The stored local color plane correction values can be updated using an average of the local color plane correction values associated with the first and second copies of the print job. The average of the local color plane correction values can be determined using respective local color plane correction values associated with a predetermined number of subsequent copies of the print job. A rolling average of the local color plane correction values can also be computed using the respective local color plane correction values associated with the subsequent copies of the print job.

In another aspect of the invention, a method for performing color-to-color correction for printing multiple print jobs can comprise receiving a first print job, wherein the first print job has one or more documents, receiving a second print job, wherein at least a portion of one of the documents in the second print job is different from a corresponding document in the first print job, and printing a copy of the first print job. One or more processors can be used to:

i) determine a plurality of color plane registration errors produced during the printing of the copy of the first print job;

ii) to determine local color plane correction values based on the plurality of color registration errors; and iii) to compute a difference between the corresponding documents in the first print job and second print job.

When the amount of difference is less than a predetermined threshold, the local color plane correction values can be used to print the second print job. The local color plane correction values can be stored in processor accessible memory for printing subsequent print jobs. When the difference is more than the predetermined threshold, the method can further include determining matching portions of the first and second print job, printing the matching portions of the second print job using the local color plane correction values for the corresponding portion of the first print job, and printing the non-matching portions of the second print job without using the local color plane correction values of the first print job. The difference between the first and second print job can be determined based on image content of the first and second print job or using the high ink laydown regions of the first and second print jobs.

A printing system for printing a second print job using color plane correction values determined from printing a first print job can comprise a plurality of printheads adapted to print on a print medium, wherein each of the plurality of printheads prints each of a plurality of color planes of a first print job. One or more processors can be used to:

i) determine a plurality of color plane registration errors produced during the printing of the first print job;

ii) determine a plurality of local color plane correction values for each color registration error produced during the printing of the first print job, wherein each of the plurality of local color plane correction values corresponds to one of the plurality of color registration errors; and iii) wherein at least a portion of one of the documents in the second print job is different from a corresponding document in the first print job, to compute a difference between the corresponding documents in the first print job and second print job.

When the difference is less than a predetermined threshold, the plurality of printheads can print the second print job using the local color plane correction values from the first print job.

A processor accessible storage device can be used to store the local color plane correction values for printing subsequent print jobs. When the difference is more than the predetermined threshold, a processor can be used to determine matching portions of the first and second print job. The plurality of printheads prints the matching portions of the second print job using the local color plane correction values for the corresponding portion of the first print job and the non-matching portions of the second print job without using the local color plane correction values of the first print job.

The invention has been described in detail with particular reference to certain aspects thereof, but it will be understood that variations and modifications can be effected within the spirit and scope of the invention. And even though specific aspects of the invention have been described herein, it should be noted that the application is not limited to these aspects. In particular, any features described with respect to one aspect of the invention may also be used in other aspects, where compatible. And the features of the different aspects of the invention may be exchanged, where compatible.

PARTS LIST 100 printing system
102 first tower
104 second tower
106 linehead
108 dryer
110 quality control sensor
112 print medium
114 transport direction
116 turnover module
118 processor
120 storage device
200 printhead
202 nozzle array
204 support structure
206 heat
300 print job
302 page of document 1
304 page of document 1
306 page of document 2
308 page of document 2
310 page of document 3
312 page of document 3
314 page of document N
316 page of document N
400 reference color plane
402 color plane
404 in-track direction
406 cross-track direction
502 color plane
602 color plane
700 plot of color registration errors in cross track direction for first color for first tower
702 plot of color registration errors in cross track direction for second color for first tower
704 plot of color registration errors in cross track direction for third color for first tower
800 plot of color registration errors in in-track direction for first color for first tower
802 plot of color registration errors in in-track direction for second color for first tower
804 plot of color registration errors in in-track direction for third color for first tower
900 plot of color registration errors in cross track direction for first color for second tower
902 plot of color registration errors in cross track direction for second color for second tower
904 plot of color registration errors in cross track direction for third color for second tower
1000 plot of color registration errors in in-track direction for first color for second tower
1002 plot of color registration errors in in-track direction for second color for second tower
1004 plot of color registration errors in in-track direction for third color for second tower
1100 plot of color registration errors in cross track direction for first color for first tower after global corrections
1102 plot of color registration errors in cross track direction for second color for first tower after global corrections
1104 plot of color registration errors in cross track direction for third color for first tower after global corrections
1106 points for starting documents in print job
1200 plot of color registration errors in in-track direction for first color for first tower after global corrections
1202 plot of color registration errors in in-track direction for second color for first tower after global corrections
1204 plot of color registration errors in in-track direction for third color for first tower after global corrections
1206 points for starting documents in print job
1300 plot of color registration errors in cross track direction for first color for second tower after global corrections
1302 plot of color registration errors in cross track direction for second color for second tower after global corrections
1304 plot of color registration errors in cross track direction for third color for second tower after global corrections
1306 points for starting documents in print job
1400 plot of color registration errors in in-track direction for first color for second tower after global corrections
1402 plot of color registration errors in in-track direction for second color for second tower after global corrections
1404 plot of color registration errors in in-track direction for third color for second tower after global corrections
1400 plot for first color
1402 plot for second color
1404 plot for third color
1406 points for starting documents in print job
1502 margin area
1504 registration mark
1506 registration element of first color
1508 registration element of second color
1510 registration element of third color
1512 registration element of fourth color
1602 plot of variability in local color registration errors in cross track direction for one copy of print job
1604 plot of variability in local color registration errors in cross track direction for multiple copies of print job
1702 plot of variability in local color registration errors in in-track direction for one copy of print job
1704 plot of variability in local color registration errors in in-track direction for multiple copies of print job
1802 plot of variability in local color registration errors in cross track direction for one copy of print job
1804 plot of variability in local color registration errors in cross track direction for multiple copies of print job 1902 plot of variability in local color registration errors in cross track direction for one copy of print job
1904 plot of variability in local color registration errors in cross track direction for multiple copies of print job
2004 registration mark outside printed document area
2006 registration mark inside printing document area
2100 Step of defining segments
2102 Step of printing first copy
2104 Step of determining global color plane registration errors
2106 Step of determining global color plane correction values
2108 Step of printing using global color plane correction values
2110 Step of determining local color plane registration errors
2112 Step of determining locally adjusted global color plane correction values
2114 Step of storing locally adjusted global color plane correction values
2116 Step of printing subsequent copies using locally adjusted global color plane correction values
2118 Step of updating stored locally adjusted global color plane correction values
2200 Step of defining local segments in the in-track direction
2202 Step of defining local segments in the in-track direction
2204 Step of printing a plurality of registration marks
2206 Step of determining color plane registration errors
2300 Step of receiving a first print job
2302 Step of printing a first print job
2304 Step of determining color registration errors
2306 Step of determining local color plane correction values
2308 Step receiving a second print job
2310 Step of determining difference between first and second print job
2312 Step of determining if difference is less than threshold
2314 Step of printing second print job
2316 Step of determining matching portions of first and second print jobs
2318 Step of printing matching portions
2320 Step of printing non-matching portions
2322 Step of storing local color plane correction values

The invention claimed is:

1. A method for performing color-to-color correction for printing multiple copies of a print job having one or more documents, comprising:
printing a first copy of the print job using a plurality of color planes;
determining a first plurality of color registration errors produced during the printing of the first copy of the print job;
for each document in the print job, using a processor to determine a first plurality of local color plane correction values for each color registration error produced during the printing of the first copy of the print job, wherein each of the first plurality of local color plane correction values corresponds to one of the first plurality of color registration errors; and
printing a second copy of the print job using the local color plane correction values for each document in the print job.

2. The method as in claim 1, further comprising storing the plurality of local color plane correction values in processor accessible memory for printing subsequent print jobs.

3. The method as in claim 2, further comprising:
determining a second plurality of color registration errors produced during the printing of the second copy of the print job;
for each document in the second copy of the print job, using the processor to determine a second plurality of local color plane correction values for each second color registration error produced during the printing of the second copy of the print job, wherein each of the second plurality of local color plane correction values corresponds to one of the second plurality of color registration errors;
using the processor to update each stored local color plane correction value using the respective second local color plane correction value associated with the printing of the second copy of the print job; and
printing a subsequent copy of the print job using the updated local color plane correction values for each document in the print job.

4. The method as in claim 3, further comprising storing the updated local color plane correction values in processor accessible memory for printing subsequent print jobs.

5. The method as in claim 3, wherein using the processor to update each stored local color plane correction value further comprises:
using the processor to periodically or non-periodically update each of the stored local color plane correction values using the respective local color plane correction values associated with the printing of two or more subsequent copies of the print job.

6. The method as in claim 3, wherein using the processor to update each stored local color plane correction value further comprises:
using the processor to update each of the stored local color plane correction values after each subsequent print job using the respective local color plane correction values associated with the printing of the subsequent copy of the print job.

7. The method as in claim 3, using the processor to update each stored local color plane correction value further comprises determining an average of the local color plane correction values associated with the first and second copies of the print job.

8. The method as in claim 5, wherein using the processor to periodically update each of the stored local color plane correction values further comprises:
for each document in the print job and for each type of color plane correction value, using the processor to determine an average of the local color plane correction values using respective local color plane correction values associated with a predetermined number of subsequent copies of the print job.

9. The method as in claim 5, wherein using the processor to update each of the stored local color plane correction values further comprises:
for each document in the print job and for each type of color plane correction value, using the processor to compute a rolling average of the local color plane correction values using the respective local color plane correction values associated with the subsequent copies of the print job.

10. The method as in claim 1, wherein the color registration errors include at least one of the following types: translation of the color planes, skew of the color planes, rotation of the color planes, or magnification of the color planes, or combinations thereof, further comprising determining the first plurality of color registration errors produced during the printing of the first copy of the print job using a processor to determine a plurality of color registration errors for each of the at least one type of color registration errors with respect to a reference color plane.

11. The method as in claim 3, wherein color registration errors include at least one of the following types: translation of the color planes, skew of the color planes, magnification of the color planes, or combinations thereof, further including determining the second plurality of color registration errors produced during the printing of the second copy of the print job using a processor to determine a plurality of color registration errors for each of the at least one type of color registration errors with respect to a reference color plane.

12. The method as in claim 1, wherein determining the first plurality of color registration errors further includes:
   defining local segments for the documents in the print job in an in-track or a cross-track direction;
   printing a plurality of registration marks corresponding to the defined local segments for each color plane; and
   using the processor to measure the color registration errors based on the corresponding each of the plurality of registration marks for each color plane.

13. The method as in claim 12, further including printing the plurality of registration marks in a margin area of the print medium such that the printed registration marks lie outside a printed document portion of the print job.

14. The method as in claim 12, wherein defining local segments further comprises;
   determining regions of high ink laydown and low ink laydown; and
   defining more local segments in high ink laydown regions than in low ink laydown regions.

15. The method as in claim 1, further including using the processor to smooth the local color correction values to provide smoothly varying corrections for adjacent locations in the print job.

* * * * *